(12) United States Patent
Carels et al.

(10) Patent No.: US 7,390,378 B2
(45) Date of Patent: Jun. 24, 2008

(54) METHOD OF CURLING FIBER AND ABSORBENT SHEET CONTAINING SAME

(75) Inventors: Jeffrey R. Carels, Green Bay, WI (US); Robert L. de Jong, Appleton, WI (US); Daniel W. Sumnicht, Green Bay, WI (US); Jeffrey A. Lee, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 559 days.

(21) Appl. No.: 10/893,515

(22) Filed: Jul. 16, 2004

(65) Prior Publication Data

US 2005/0051286 A1 Mar. 10, 2005

Related U.S. Application Data

(60) Provisional application No. 60/489,581, filed on Jul. 23, 2003.

(51) Int. Cl.
*D21H 15/04* (2006.01)

(52) U.S. Cl. ............ 162/58; 162/4; 162/9; 162/56; 162/57; 162/68; 162/70; 162/72; 162/78; 162/90

(58) Field of Classification Search ............ 162/4, 162/9, 23, 68, 78, 90, 28, 56–58, 91, 100, 162/72, 70
See application file for complete search history.

(56) References Cited

U.S. PATENT DOCUMENTS

| 2,516,348 | A | 7/1950 | Hill et al. ............ 92/20 |
| 3,432,936 | A | 3/1969 | Cole et al. ............ 34/6 |
| 3,994,771 | A | 11/1976 | Morgan, Jr. et al. ......... 162/113 |
| 4,102,737 | A | 7/1978 | Morton ............ 162/113 |
| 4,409,065 | A | 10/1983 | Kasser |
| 4,431,479 | A * | 2/1984 | Barbe et al. ............ 162/9 |
| 4,529,480 | A | 7/1985 | Trokhan |
| 4,543,156 | A | 9/1985 | Cheshire et al. ............ 162/101 |
| 4,974,781 | A | 12/1990 | Placzek ............ 241/17 |
| 4,976,819 | A | 12/1990 | Minton ............ 162/9 |
| 5,119,994 | A | 6/1992 | Placzek ............ 241/17 |
| 5,169,496 | A * | 12/1992 | Wagle et al. ............ 162/129 |

(Continued)

FOREIGN PATENT DOCUMENTS

CA 2053505 4/1999

(Continued)

*Primary Examiner*—Eric Hug
(74) *Attorney, Agent, or Firm*—Michael W. Ferrell

(57) ABSTRACT

A method of providing papermaking fibers with durable curl comprising: a) introducing papermaking fiber into a rotatable drum adapted for operation at elevated pressure; b) rotating the drum containing the papermaking fiber while maintaining: i) the fiber in aqueous dispersion having a consistency of from about 5 to about 45 percent; ii) a temperature of above about 100° C.; the drum being configured such that the aqueous fiber dispersion contacts the rotating wall of the drum during rotation thereof and the mechanical action of the drum on the dispersion provides a durable curl to the papermaking fiber; removing the curled fiber from the rotatable drum wherein the temperature, time, consistency and energy input to the fiber are controlled such that fibers treated exhibit a curl elevation of at least 50 percent at 1 hour storage time.

19 Claims, 18 Drawing Sheets

U.S. PATENT DOCUMENTS

| | | |
|---|---|---|
| 5,501,768 A | 3/1996 | Hermans et al. ............... 162/9 |
| 5,510,002 A | 4/1996 | Hermans et al. ............ 162/113 |
| 5,772,845 A * | 6/1998 | Farrington et al. .......... 162/109 |
| 5,865,955 A | 2/1999 | Ilvespaa et al. ............. 162/207 |
| 5,891,309 A | 4/1999 | Page et al. .................. 162/281 |
| 5,932,068 A | 8/1999 | Farrington, Jr. et al. ..... 162/117 |
| 5,968,590 A | 10/1999 | Ahonen et al. ............... 427/209 |
| 6,001,421 A | 12/1999 | Ahonen et al. ............... 427/316 |
| 6,119,362 A | 9/2000 | Sundqvist .................... 34/120 |
| 6,413,362 B1 * | 7/2002 | Hu ................................ 162/4 |
| 6,432,267 B1 | 8/2002 | Watson ....................... 162/111 |
| 6,458,240 B1 | 10/2002 | Bouchette et al. .............. 162/4 |
| 2001/0040015 A1 | 11/2001 | Lee ............................... 162/9 |
| 2002/0011317 A1 * | 1/2002 | Lee ............................... 162/9 |

FOREIGN PATENT DOCUMENTS

| | | |
|---|---|---|
| EP | 1 132 517 A1 | 9/2001 |
| WO | WO 00/63486 | 10/2000 |

\* cited by examiner

METHOD OF CURLING FIBER AND ABSORBENT SHEET CONTAINING SAME

CROSS-REFERENCE TO RELATED APPLICATION

This Non-Provisional Patent Application is based upon U.S. Provisional Application Ser. No. 60/489,581 of the same title, filed Jul. 23, 2003, the priority of which is hereby claimed.

TECHNICAL FIELD

This application relates to methods of curling fiber generally and incorporating curled fiber into absorbent sheet in order to increase the bulk and absorbency of the sheet. Generally speaking, the fiber is curled by way of applying mechanical agitation in the presence of saturated steam. In one preferred embodiment, the present invention is practiced with a rotoclave wherein papermaking fiber is curled in a rotating drum while maintaining the fiber in an aqueous dispersion having a consistency of from about 5 to about 45 percent at temperatures above about 100° C. The curling/tumbling action of the rotoclave also operates to increase the tubularity of the fiber such that unexpected increases in absorbency are seen in recycle fiber.

BACKGROUND

Providing curl to papermaking fibers is known in the art. There is disclosed for example in U.S. patent application Ser. No. 09/793,863 to Lee a process for producing high bulk cellulosic fibers exhibiting durable curl. The method of the '863 application involves curling the fiber in a disk refiner at elevated temperature and pressure. See Publication No. US 2001/0040015. Other references relating to fiber curling include U.S. Pat. No. 4,409,065 to Kasser; U.S. Pat. No. 4,431,479 to Barbe et al.; U.S. Pat. No. 4,976,819 to Minton; U.S. Pat. No. 5,501,768 to Hermans et al.; as well as U.S. Pat. No. 5,772,845 to Farrington et al.

Rotoclaves have been used to recycle waste paper. In this regard there is disclosed in U.S. Pat. No. 6,548,240 to Bouchette et al. a method of separating fiber from difficult to process coated and ink paper products. Further discussion of the rotoclave apparatus and its use for repulping may be found in U.S. Pat. No. 4,974,781 to Placzek and U.S. Pat. No. 5,119,994 also to Placzek.

It has been found that certain fibers may be provided with unexpectedly elevated and durable curl by treating them in fibrous form in pressure vessels at 35-90 psig in saturated steam with mechanical agitation. The fiber to be curled is maintained in an aqueous dispersion having an intermediate to relatively high consistency.

SUMMARY OF THE INVENTION

There is thus provided in accordance with the invention a method of providing papermaking fibers with durable curl by way of: a) introducing papermaking fiber into a rotatable drum adapted for operation at elevated pressure; b) rotating the drum containing the papermaking fiber while maintaining: i) the fiber in aqueous dispersion having a consistency of from about 5 to about 45 percent; ii) a temperature of above about 100° C.; the drum being configured such that the aqueous fiber dispersion contacts the rotating wall of the drum during rotation thereof and the mechanical action of the drum on the dispersion provides a durable curl to the papermaking fiber; removing the curled fiber from the rotatable drum wherein the temperature, time, consistency and energy input to the fiber are controlled such that fibers treated exhibit a curl elevation of at least 50 percent at 1 hour storage time. Typically, the treated fiber exhibits a curl elevation of at least 100 percent at 1 hour storage time and preferably the treated fiber exhibits a curl elevation of at least 150 percent at 1 hour storage time.

The net mechanical energy input to the fiber is generally less than about 0.75 HP-Day/Ton; typically the net mechanical energy input to the fiber is less than about 0.5 HP-Day/Ton; and in many cases the net mechanical energy input to the fiber is from about 0.2 to about 0.6 HP-Day/Ton. The papermaking fiber may be introduced into the drum in substantially fibrous form or in web form such as wastepaper. Regardless of the form of papermaking fiber fed, steam is typically maintained in the drum at a pressure of from about 35 psig to about 75 psig while the fiber is heat-treated and convolved in the drum usually for at least about 15 minutes. The fiber may be heat-treated and convolved in the drum for up to about 60 minutes or more, however, more typically the fiber is heat-treated and convolved in the drum for up to about 30 minutes. The papermaking fiber preferably includes low yield fiber such as Kraft or sulphite pulp and may be secondary fiber; especially preferred is secondary fiber which is predominantly low yield fiber.

Another aspect of the invention is directed to a method of providing papermaking fiber with durable curl comprising: a) introducing papermaking fiber consisting predominantly of chemical pulp in substantially fibrous form into a pressure vessel at a consistency of from about 5 to about 45 percent; b) concurrently heat-treating and convolving the fiber in the pressure vessel by way of applying mechanical agitation to the fiber in the presence of saturated steam at a pressure of from about 35 psig to about 90 psig for a treatment duration of at least about 5 minutes, wherein the treatment of the fiber is operable to increase the mean curl of the fiber by at least about 50 percent.

Still another aspect of the invention is a method of providing papermaking fibers with durable curl comprising: a) introducing papermaking fiber in web form into a rotatable drum adapted for operation at elevated pressure; b) rotating the drum containing the papermaking fiber while maintaining: i) the fiber in aqueous dispersion having a consistency of from about 5 to about 45 percent; ii) a temperature of above about 100° C.; the drum being configured such that the aqueous fiber dispersion contacts the rotating wall of the drum during rotation thereof and the mechanical action of the drum on the dispersion provides a durable curl to the papermaking fiber; and removing the curled fiber from the rotatable drum wherein the temperature, time, consistency and energy input to the fiber are controlled such that fibers contained in a web form are rendered into substantially fibrous form and the mean curl of the papermaking fiber is increased by at least 20 percent. A typical process includes introducing the fiber in the form of wastepaper and adding a chemical aid to the pressurized rotatable drum. The chemical aids usually include at least one chemical aid selected from the group consisting of alkaline agent, buffer, bleaching agent, detergents, surfactants, solvents, dispersants, chelating agents, sequestrants and mixtures thereof. A preferred alkaline agent is sodium hydroxide and preferred bleaching agents are hydrogen peroxide and sodium hypochlorite. One preferred embodiment is wherein the chemical aid is a mixture of sodium hydroxide and hydrogen peroxide. Especially preferred is wherein sodium hydroxide is present in the drum at a concentration of at least about 0.25 weight percent based on the amount of water and caustic in the drum.

The foregoing and other features and advantages of the present invention will become readily apparent from the discussion which follows.

BRIEF DESCRIPTION OF DRAWINGS

The invention is described in detail below in connection with numerous embodiments and figures wherein like numerals designate similar parts. In the Figures.

DETAILED DESCRIPTION

Figure 1:
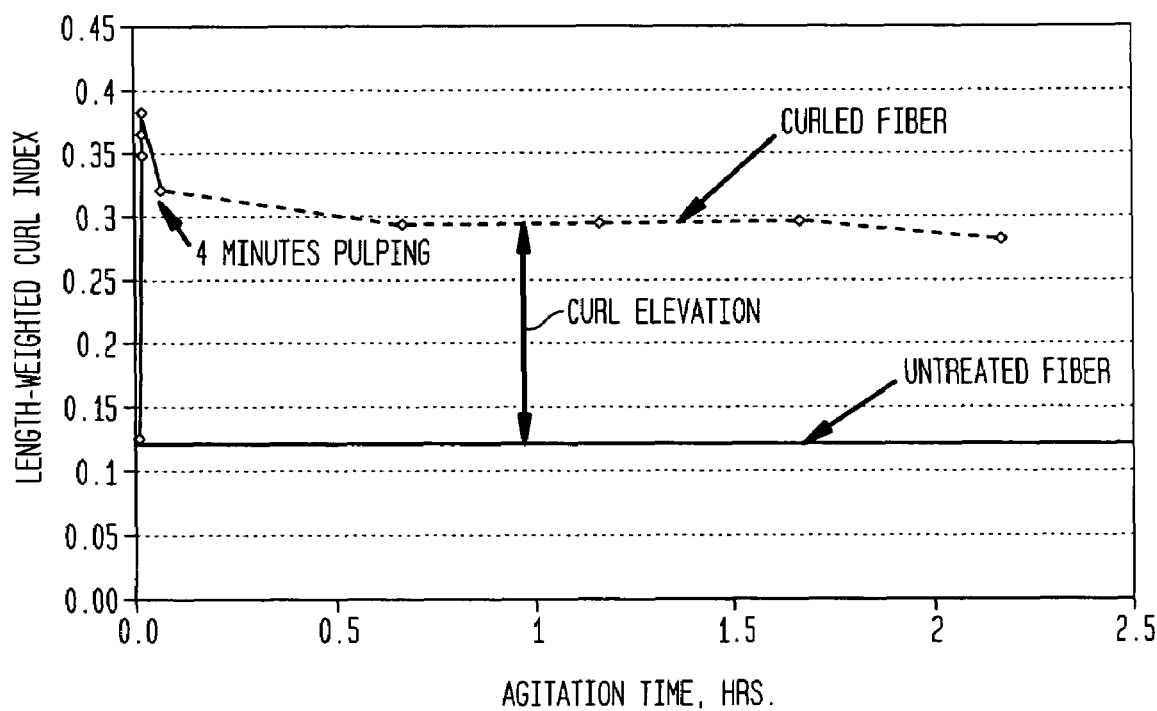
FIG. 1 is a plot of mean curl versus storage time in a machine chest at 2-3 percent consistency.

The invention is described in detail below for purposes of description and exemplification only. Modifications within the spirit and scope of the present invention, set forth in the appended claims, will be readily apparent to those of skill in the art. Terminology used herein is given its ordinary and most general meaning unless more specifically defined herein or the context indicates otherwise.

Materials, Test Methods and Definitions

Fibers

The terms "fibrous", "furnish", "aqueous furnish" and the like include all paper absorbent sheet-forming furnishes and fibers in dispersed aqueous fibrous form as opposed to in bonded form in the form of paper. The term "cellulosic" is meant to include any papermaking fiber having cellulose as a major constituent. "Papermaking fibers" include virgin pulps or recycle cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers can be liberated from their source material by any one of a number of chemical pulping processes familiar to one experienced in the art including sulfate, sulfite, polysulfide, soda pulping, etc. The pulp can be bleached if desired by chemical means including the use of chlorine, chlorine dioxide, oxygen and so forth.

Fibers or pulp for use according to the present invention are also procured by recycling of pre- and post-consumer paper products. Fiber may be obtained, for example, from the recycling of printers' trims and cuttings, including book and clay coated paper, post consumer paper including office and curbside paper recycling including old newspaper. The various collected paper can be recycled using means common to the recycled paper industry. As the term is used herein, recycle or secondary fibers include those fibers and pulps which have been formed into a web and reisolated from its web matrix by some physical, chemical or mechanical means. The papers may be sorted and graded prior to pulping in conventional low, mid, and high-consistency pulpers. In the pulpers the papers are mixed with water and agitated to break the fibers free from the sheet. Chemicals may be added in this process to improve the dispersion of the fibers in the slurry and to improve the reduction of contaminants that may be present. Following pulping, the slurry is usually passed through various sizes and types of screens and cleaners to remove the larger solid contaminants while retaining the fibers. It is during this process that such waste contaminants as paper clips and plastic residuals are removed. The pulp is then generally washed to remove smaller sized contaminants consisting primarily of inks, dyes, fines and ash. This process is generally referred to as deinking. Deinking can be accomplished by several different processes including wash deinking, flotation deinking, enzymatic deinking and so forth. One example of a sometimes preferred deinking process by which recycled fiber for use in the present invention can be obtained is called flotation. In this process small air bubbles are introduced into a column of the furnish. As the bubbles rise they tend to attract small particles of dye and ash. Once upon the surface of the column of stock they are skimmed off.

The preferred conventional fibers according to the present invention may consist predominantly of secondary or recycle fibers that possess significant amounts of ash and fines. It is common in the industry to hear the term ash associated with virgin fibers. This is defined as the amount of ash that would be created if the fibers were burned. Typically no more than about 0.1% to about 0.2% ash is found in virgin fibers. Ash, as the term is used here, includes this "ash" associated with virgin fibers as well as contaminants resulting from prior use of the fiber. Furnishes utilized in connection with the present invention may include excess of amounts of ash greater than about 1% or more. Ash originates primarily when fillers or coatings are added to paper during formation of a filled or coated paper product. Ash will typically be a mixture containing titanium dioxide, kaolin clay, calcium carbonate and/or silica. This excess ash or particulate matter is what has traditionally interfered with processes using recycle fibers, thus making the use of recycled fibers unattractive. In general recycled paper containing high amounts of ash is priced substantially lower than recycled papers with low or insignificant ash contents. Thus, there will be a significant advantage to a process for making a premium or near-premium product from recycled paper containing excessive amounts of ash.

Furnishes containing excessive ash also typically contain significant amounts of fines. Ash and fines are most often associated with secondary, recycled fibers, post-consumer paper and converting broke from printing plants and the like. Secondary, recycled fibers with excessive amounts of ash and significant fines are available on the market and are quite cheap because it is generally accepted that only very thin, rough, economy towel and tissue products can be made unless the furnish is processed to remove the ash and fines. The present invention makes it possible to achieve a paper product with high void volume and premium or near-premium qualities from secondary fibers having significant amounts of ash and fines without any need to preprocess the fiber to remove fines and ash. While the present invention contemplates the use of fiber mixtures, including the use of virgin fibers, fiber in the products according to the present invention may have greater than 0.75% ash, and sometimes more than 1% ash.

"Fines" constitute material within the furnish that will pass through a 200 mesh screen. Ash content can be determined using TAPPI Standard Method T211 OM93. Freeness, abbreviated CSF is determined in accordance with TAPPI Standard T 227 OM-94 (Canadian Standard Method).

It is preferred to use furnishes which consist primarily or predominantly of chemically pulped fibers in connection with the invention as opposed to mechanically pulped fibers which do not curl well by way of the gentle curling/tumbling action of the rotoclave. Chemical pulp means and includes Kraft pulp, sulfite pulp, soda pulp and the like. This pulp is sometimes referred to as low yield pulp herein. Mechanical pulp, also called groundwood includes: GWP (Groundwood Pulp)—Log ground at atmospheric pressure; RMP (Refiner Mechanical Pulp)—Refining of chips at atmospheric pressure in a refiner (in some cases, the refiner outlet may be pressurized); TMP (Thermo Mechanical Pulp)—Thermal pre-treatment and refining of the chips under pressure, with the second refiner stage also under pressure in most cases; CMP (Chemi-mechanical Pulp)—Chips are pre-treated, usually with sodium sulfite and caustic, then refined without pressure; CTMP (Chemithermo-mechanical Pulp)—Chips are pre-treated in the same way as for CMP, but with a lower chemical charge, then refined under pressure; BCTMP (Bleached CTMP)—CTMP which is then bleached in one or two stages with peroxide; APMP (Alkaline Peroxide Mechanical Pulp)—Pulp which is treated with caustic and peroxide before refining; APP (Alkaline Peroxide Pulp)—Similar to APMP, but where the heavy metals are removed from the chips before alkaline-peroxide treatment. Mechanical pulps have much higher lignin content than chemical pulp and recycle or secondary fiber contains both types of pulp. The lignin content of mixed furnishes, those containing mechanical and chemical pulp correlates with the KAPPA number. The KAPPA number is defined in TAPPI Method T 236 om-99P as follows: the KAPPA number is the volume (in millimeters) of 0.1N potassium permanganate solution consumed by one gram of moisture-free pulp. The results are corrected to 50% consumption of the permanganate added. Lignin content is measured by way of TAPPI method T222-98 (acid insoluble lignin). In this method, the carbohydrates in wood and pulp are hydrolyzed and solubilized by sulfuric acid; the acid-insoluble lignin is filtered off, dried and weighed.

Sheet and Fiber Properties

Absorbency or sorptive capacity and rate (SAT) are measured in accordance with TAPPI T 561 PM-96. Where "Slow Rate" SAT values are indicated, the cutoff rate is 1 mg in 20 seconds. These or other procedures for determining absorbency may include using a simple absorbency tester. The simple absorbency tester is a particularly useful apparatus for measuring the hydrophilicity and absorbency properties of a sample of tissue, napkins, or towel. In this test a sample of tissue, napkins, or towel 2.0 inches in diameter is mounted between a top flat plastic cover and a bottom grooved sample plate. The tissue, napkin, or towel sample disc is held in place by a ⅛ inch wide circumference flange area. The sample is not compressed by the holder. De-ionized water at 73° F. is introduced to the sample at the center of the bottom sample plate through a 1 mm. diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below the cutoff rate, the test is terminated. The amount of water removed from the reservoir and absorbed by the sample is weighed and reported as grams of water per square meter of sample. In practice, an M/K Systems Inc. Gravimetric Absorbency Testing System is used. This is a commercial system obtainable from M/K Systems Inc., 12 Garden Street, Danvers, Mass., 01923. Water absorbent capacity is actually determined by the instrument itself. The capacity is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. Unless otherwise indicated, the cutoff criteria used herein is 1 mg in 20 seconds as noted above. Water absorbency rate may alternatively be expressed in seconds and is the time it takes for a sample to absorb a 0.1 gram droplet of water disposed on its surface by way of an automated syringe. The test specimens are preferably conditioned at 23° C.±1° C. (73.4±1.8° F.) at 50% relative humidity. For each sample, 4 3×3 inch test specimens are prepared. Each specimen is placed in a sample holder such that a high intensity lamp is directed toward the specimen. 0.1 ml of water is deposited on the specimen surface and a stop watch is started. When the water is absorbed, as indicated by lack of further reflection of light from the drop, the stopwatch is stopped and the time recorded to the nearest 0.1 seconds. The procedure is repeated for each specimen and the results averaged for the sample.

Curl index is measured with a fiber quality analyzer. Generally the curl index (length weighted, unless otherwise specified) is determined by standard procedure in an Op Test fiber analyzer, model number Code LDA 96 in accordance with the equations set forth hereinafter.

The curl generated can be quantified by several means. Unless otherwise specified, the OpTest Fiber Quality Analyzer (FQA) from OpTest Equipment, Hawkesbury, Ontario, Canada, Model No. Code LDA 96, was utilized to determine fiber length and curl indices. The analyzer is operated at standard settings, that is, the settings are for fibers 0.5 mm and longer with curl indices from 0 to 5. The FQA measures individual fiber contour and projected lengths by optically imaging fibers with a CCD camera and polarized infrared light. The curl index, CI, is determined by:

$$CI = \frac{L}{l} - 1$$

L=contour length
l=projected length

The length weighted curl index, $CI_{LW}$, is calculated by multiplying the sum of the individual CI by its contour length and dividing by the summation of the contour lengths:

$$CI_{LW} = \frac{\sum_i CI_i L_i}{\sum L_i}$$

$CI_i$=individual arithmetic curl index
$L_i$=individual contour length

Length weighted mean curl indices typically between 0.100 and 0.450 have been generated in the process.

Unless otherwise indicated, "curl index", "mean curl" and like terminology as used herein refers to length weighted curl index of the pulp. Curl elevation means the increase in mean curl with respect to like fiber from a like source which has not been rotoclaved at elevated temperatures. In order to determine curl durability, fiber curled in accordance with the present invention preferably maintains the added curl when treated in a laboratory disintegrator (of the type specified in TAPPI Standard T205 Sp-95) for 30 minutes at 1 percent consistency, at ambient conditions and more preferably the added curl survives at 60° C. for 30 minutes. Such equipment is available from Testing Machines Inc., Amityville, N.Y. and is suitably operated at 3,000 rpm for the test procedure. Other temperatures and speeds may be used if so desired to test the suitability of the fiber for an application.

Another, perhaps more applicable standard of durability is seen in the ability of the elevated curl to persist after repulping, storage in a machine chest under agitation and pumping through a stock pump. This procedure simulates conditions of interest in a papermaking mill. To determine curl elevation durability by this method, the mean curl is measured immediately before treatment in a rotoclave and after storage as described as follows: The material is re-pulped after curling in a rotoclave at 5-6 percent consistency in a disintegrator or other similar device at room temperature and then stored in a machine chest at room temperature with sufficient agitation to maintain the fiber in suspension. The time the fiber is in the machine chest is the time recorded for a given sample of fiber as the storage time.

A sample of fiber is pumped with a stock pump from the machine chest after a given storage time and the mean curl is again measured. The curl elevation at a given storage time is then calculated as:

$$\frac{(\text{Mean Curl at Storage Time} - \text{Mean Curl of Untreated Fiber})}{(\text{Mean Curl of Untreated Fiber})} \times 100\%$$

Curl elevations of 100% or more at 1 hour storage time are preferred.

The FQA kink index, derived from the Kibblewhite kink index, is a weighted sum of the distinct angles or discontinuities in each fiber divided by the fiber contour length:

$$\text{Kink index} = \frac{2N_{21°-45°} + 3N_{46°-90°} + 4N_{91°-180°}}{L}$$

Where $N_{a-b}$ represents the number of kinks in an individual fiber which have a change in fiber direction between a and b degrees. Thus, for a 1 mm fiber a kink index of 2.0 mm$^{-1}$ would correspond to only one small-angle kink. The curling process shifts the distribution toward higher kink index; however, very few fibers have a kink index above about four.

Fiber length and coarseness can be measured with an FQA as noted above or using a fiber-measuring instrument such as the Kajaani FS-200 analyzer available from Valmet Automation of Norcross, Ga. For fiber length measurements, a dilute suspension of the fibers (approximately 0.5 to 0.6 percent) whose length is to be measured may be prepared in a sample beaker and the instrument operated according to the procedures recommended by the manufacturer. The report range for fiber lengths is set at an instrument's minimum value of, for example, 0.07 mm and a maximum value of, for example, 7.2 mm; fibers having lengths outside of the selected range are excluded. Three calculated average fiber lengths may be reported. The arithmetic average length is the sum of the product of the number of fibers measured and the length of the fiber divided by the sum of the number of fibers measured. The length-weighted average fiber length is defined as the sum of the product of the number of fibers measured and the length of each fiber squared divided by the sum of the product of the number of fibers measured and the length the fiber. The weight-weighted average fiber length is defined as the sum of the product of the number of fibers measured and the length of the fiber cubed divided by the sum of the product of the number of fibers and the length of the fiber squared.

Fiber coarseness is the weight of fibers in a sample per a given length and is usually reported as mg/100 meters. The fiber coarseness of a sample is measured from a pulp or paper sample that has been dried and then conditioned at, for example, 73.4° F. and 50% relative humidity for at least four hours. The fibers used in the coarseness measurement are removed from the sample using tweezers to avoid contamination. The weight of fiber that is chosen for the coarseness determination depends on the estimated fraction of hardwood and softwood in the sample and range from 3 mg for an all-hardwood sample to 14 mg for a sample composed entirely of softwood. The portion of the sample to be used in the coarseness measurement is weighed to the nearest 0.00001 gram and is then slurried in water. To insure that a uniform fiber suspension is obtained and that all fiber clumps are dispersed, an instrument such as the Soniprep 150, available from Sanyo Gallenkamp of Uxbridge, Middlesex, UK, may be used to disperse the fiber. After dispersion, the fiber sample is transferred to a sample cup, taking care to insure that the entire sample is transferred. The cup is then placed in the fiber analyzer as noted above. The dry weight of pulp used in the measurement, which is calculated by multiplying the weight obtained above by 0.93 to compensate for the moisture in the fiber, is entered into the analyzer and the coarseness is determined using the procedure recommended by the manufacturer.

Dry tensile strengths (MD and CD) are measured with a standard Instron test device which may be configured in various ways, using for example, 3-inch wide strips of tissue or towel, conditioned at 50% relative humidity and 23° C. (73.4° F.), with the tensile test run at a crosshead speed of 2 in/min. Tensiles are sometimes reported herein in breaking length (BL, km).

Tensile energy absorption (TEA) is measured in accordance with TAPPI test method T494 om-01.

Z-direction tensile (ZDT) is measured in accordance with TAPPI test method T-541 om-99.

Wet tensile is measured by the Finch cup method or following generally the procedure for dry tensile, wet tensile is measured by first drying the specimens at 100° C. or so and then applying a 1½ inch band of water across the width of the sample with a Payne Sponge Device prior to tensile measurement.

Wet/dry tensile ratios are simply ratios of the values determined by way of the foregoing methods.

The void volume and/or void volume ratio as referred to hereafter, are determined by saturating a sheet with a nonpolar liquid and measuring the amount of liquid absorbed. The volume of liquid absorbed is equivalent to the void volume within the sheet structure. The percent weight increase (PWI) is expressed as grams of liquid absorbed per gram of fiber in the sheet structure times 100, as noted hereinafter. More specifically, for each single-ply sheet sample to be tested, select 8 sheets and cut out a 1 inch by 1 inch square (1 inch in the machine direction and 1 inch in the cross-machine direction). For multi-ply product samples, each ply is measured as a separate entity. Multiple samples should be separated into individual single plies and 8 sheets from each ply position used for testing. Weigh and record the dry weight of each test specimen to the nearest 0.0001 gram. Place the specimen in a dish containing POROFIL™ liquid having a specific gravity of 1.875 grams per cubic centimeter, available from Coulter Electronics Ltd., Northwell Drive, Luton, Beds, England; Part No. 9902458.) After 10 seconds, grasp the specimen at the very edge (1-2 Millimeters in) of one corner with tweezers and remove from the liquid. Hold the specimen with that corner uppermost and allow excess liquid to drip for 30 seconds. Lightly dab (less than ½ second contact) the lower corner of the specimen on #4 filter paper (Whatman Lt., Maidstone, England) in order to remove any excess of the last partial drop. Immediately weigh the specimen, within 10 seconds, recording the weight to the nearest 0.0001 gram. The PWI for each specimen, expressed as grams of POROFIL per gram of fiber, is calculated as follows:

$$PWI=[(W_2-W_1)/W_1]\times 100\%$$

wherein

"$W_1$" is the dry weight of the specimen, in grams; and

"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage, whereas the void volume (gms/gm) is simply the weight increase ratio; that is, PWI divided by 100.

Calipers reported herein are 8 sheet calipers unless otherwise indicated. The sheets are stacked and the caliper measurement taken about the central portion of the stack. Preferably, the test samples are conditioned in an atmosphere of 23°±1.0° C. (73.4±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec descent rate. For finished product testing, each sheet of product to be tested must have the same number of plies as the product is sold. Select and stack eight sheets together. For napkin testing, completely unfold napkins prior to stacking. For base sheet testing off of winders, each sheet to be tested must have the same number of plies as produced off the winder. Select and stack eight sheets together. For base sheet testing off of the paper machine reel, single plies must be used. Select and stack eight sheets together. On custom embossed or printed product, try to avoid taking measurements in these areas if at all possible. Basis weight is expressed in dry weight for a given area of sheet.

Percent or % refers to weight percent and the term consistency refers to weight percent of fiber based on dry product unless the context indicates otherwise. Likewise, "ppm" refers to parts by million by weight, and the term "absorbent sheet" refers to tissue or towel made from ligno-cellulosic fiber. "Mils" means thousandths of an inch, m indicates mters, mm millimeters and so forth.

The term "tpi" refers to teeth per inch. "Predominantly" as used herein means more than 50 percent by weight on a dry basis. "MD" refers to the machine direction and "CD" to the cross machine direction.

"Substantially fibrous form" refers to papermaking fiber which is not bonded in the form of a cellulosic paper web. For purposes of this invention, lap (dried or partially dried pulp) is considered substantially fibrous form as is pulped stock in aqueous dispersion. The fiber to be curled is introduced into the rotoclave in substantially fibrous form (either wet or dry) or in web form, such as wastepaper. A "like" composition with respect to absorbent sheet means an absorbent sheet made from substantially the same papermaking furnish, whereas a "like" construction refers to papermaking sheet having substantially the same basis weight made by the same process.

A control pulp from which untreated fiber is obtained for purposes of measuring curl increase or elevation is pulped by conventional means from the same wastepaper or lap. That is to say, for purposes of measuring increase in mean curl or curl elevation, pulp from the same source is used, the difference being that the control pulp is not rotoclaved and may be pulped by conventional means as curl measurement requires.

Figure 25:
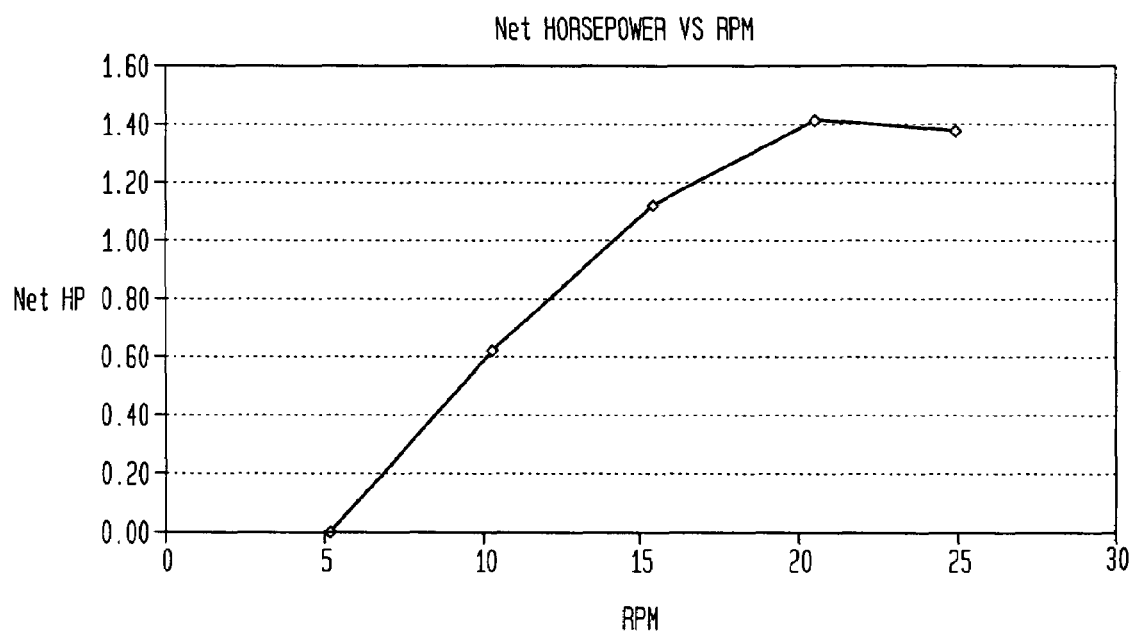
FIG. 25 is a plot of net horsepower versus rpm for a rotoclave used in connection with the fiber treatment reported in Tables 7-11.

Net mechanical energy input to fiber means that energy input in addition to the mechanical energy required to drive a rotoclave without fiber. The net mechanical energy input is based on bone-dry fiber treated. Sample calculations appear in Table 12 and are illustrated in FIG. 25.

The curl imparted to the fiber by way of the rotoclave treatment has durability which is sufficient to survive the papermaking process. Generally, the curl is retained when the fiber is re-pulped for a few minutes at 5-6 percent consistency and maintained in suspension at room temperature in a machine chest for one-half hour or more at a consistency of 2-3 percent, as is seen in FIG. 1. FIG. 1 is a plot of curl index versus time for fiber supplied to a blend chest after rotoclaving as described hereinafter in connection with Tables 7-11. Untreated fiber (SSK in this case) had a mean curl of about 0.12. Rotoclaved, heat-treated fiber had a mean curl in the 0.34-0.38 range upon discharge from the rotoclave. After brief re-pulping, at a consistency of 5-6 percent (room temperature), the pulp had a mean curl of about 0.3. The re-pulped, treated fiber was placed in a blend chest (also at room temperature) for the times indicated in FIG. 1, while the aqueous furnish (2-3 percent consistency) was agitated sufficiently to keep the fiber in suspension. Samples were taken slightly after one-half hour, one hour, one and one-half hours and two hours of storage time by pumping the dispersion through a stock pump.

It will be appreciated from FIG. 1 that fiber treated in accordance with the invention has a very durable curl; here the curl elevation is about 150 percent up to two hours and well over 100 percent after that.

Figure 2:
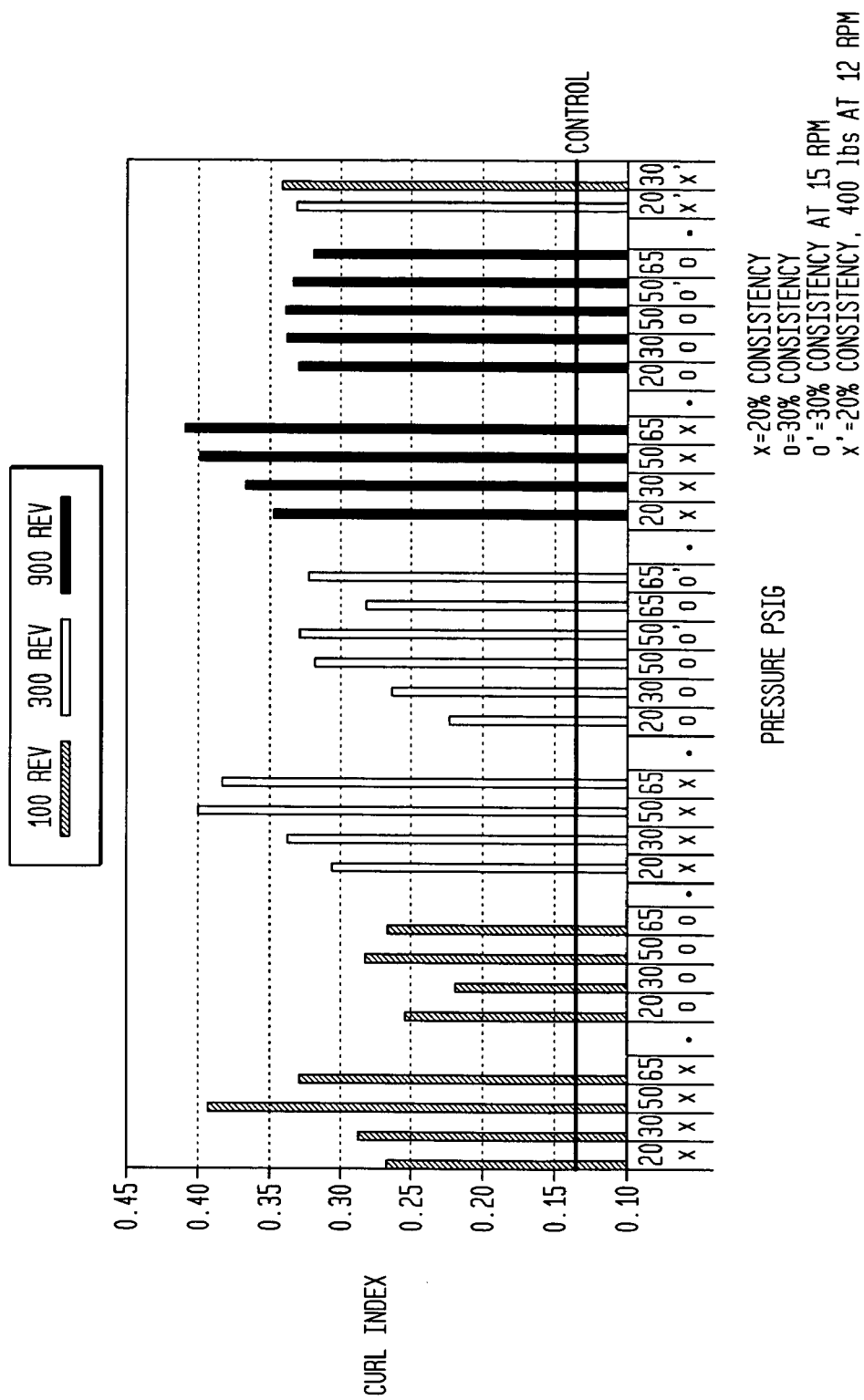
FIG. 2 is a plot of curl index of Kraft fiber versus pressure in psig, for untreated fiber, as well as curled fiber under various conditions in saturated steam.

The unexpected results of the invention of 100 percent increases in fiber curl and more are further appreciated by reference to FIG. 2 which is a bar graph showing the curl indices of Kraft fiber, untreated and after treatment at various pressures and consistencies.

The control sample of Kraft pulp had a length weighted (Lw) curl index of 0.14. As shown in FIG. 2, it was possible to obtain a curl index >0.35 in a rotoclave (described below) at 20% consistency under the following test conditions:

100 revs and 50 psig steam pressure
300 revs and 50 and 65 psig
900 revs and 20, 30, 50 and 65 psig The rotoclave and its operation are discussed in more detail immediately below.

Referring to FIGS. 3-10 there is shown a preferred apparatus 10 for practicing the process of the present invention as is disclosed, for example, in U.S. Pat. No. 5,119,994 the disclosure of which is incorporated herein by reference. Rotoclave apparatus 10 includes a heavy walled processing vessel 12 that is generally cylindrical in configuration. Heavy walls are used in the construction of vessel 12 in order that it can operate under conditions of high internal pressure as well as, on occasion, under vacuum conditions. Vessel 12 is mounted in a non-rotatable manner on a stationary support 14 having a sufficiently wide base so as to give it ample stability. Support 14 preferably utilizes structural steel members designed to effectively transfer the weight of the processor and its contained materials to an appropriate foundation (not shown).

The rotating drum is located within the shell of vessel 12 transfers its weight to support bearings which in turn transfer that load to the shell of vessel 12 and become part of the load supported by the structural supports of the shell and thus are also transferred to the foundation below the processor. A closure device or domed shaped door 16, is provided with a seal 18 and is hingedly mounted adjacent inlet 36 of vessel 12 so that substantial pressure or vacuum can be established inside the vessel as needed.

Located inside the non-rotating vessel 12 is a generally cylindrical drum 20 mounted so as to be rotatable in either direction about its axis, which axis is coincident with the axis of the vessel and is shown schematically as inclined axis 13 having an angle of inclination 15 with respect to a horizontal.

Figure 4:
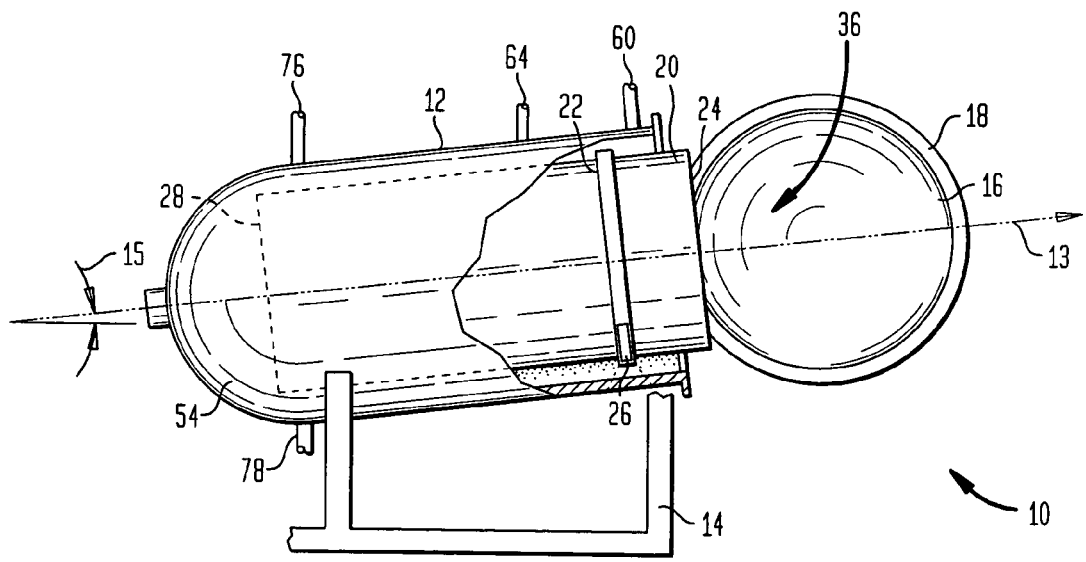
FIG. 4 is a view of the vessel of FIG. 3, in partial section, showing the rotating drum and the vessel's closure panel in the open position.
Figure 5:
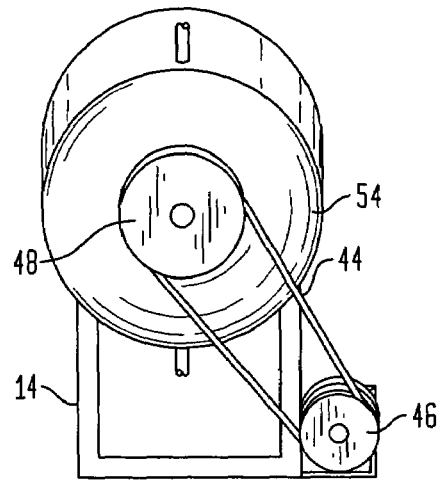
FIG. 5 is an end view in elevation of the pressure vessel of FIG. 3, this view showing a drive belt and motor used for driving the drum in rotation.
Figure 6:
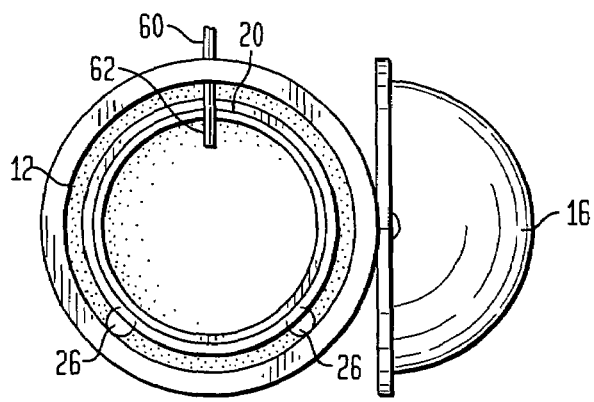
FIG. 6 is an end view in elevation of the vessel of FIG. 3, illustrating operation of the closure panel.

See FIG. 4. Drum 20 is provided with a riding ring or support ring 22 adjacent its front opening 24 with rollers or trunnion bearings 26 being positioned on the interior of the vessel 12 to contact ring 22 and thus provide support for the front end of the drum. Front end of the drum 20 is open at 24, whereas the lower end 28 of the drum is closed and watertight.

Affixed to the rear or lower end 28 of drum 20 is drive shaft 30 which is arranged to support the rear end of the drum and drive it in rotation. The shaft is rotatably supported by roller or ball bearings 32 that are in turn supported from a structural member 33 attached to vessel 12. This support arrangement is designed to fix the location of drum 20 in so far as its horizontal positioning within vessel 12 is concerned.

Drive shaft 30 of drum 20 penetrates the shell of vessel 12 and is sealed from the surroundings by a seal 34 to enable a selected pressure or a selected vacuum to be maintained from time to time within vessel 12 and of course, within drum 20. The typical rate of rotation for drum is between about 5 and 30 rpm and is preferably approximately 8 to 15 rpm to facilitate a uniform loading of forces on the drive assembly 38 utilized for driving the drum rotation.

Figure 3:
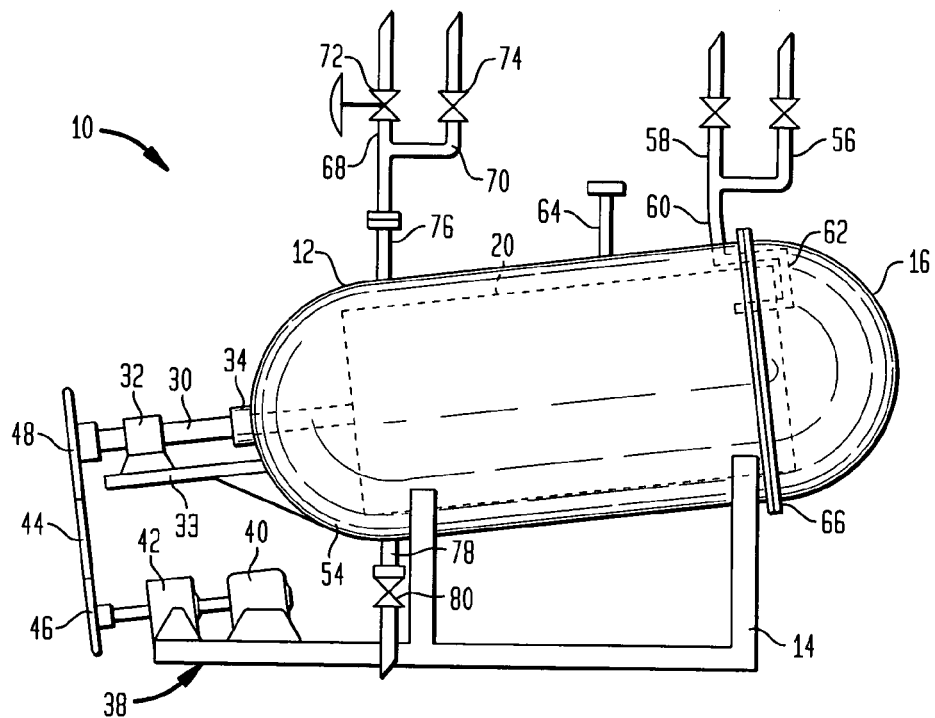
FIG. 3 is a side elevational view of a pressure vessel which may be used in accordance with the process of the present invention, such vessel having a rotating drum for curling the fiber.

Drum 20 is capable of being rotated in either direction about its axis by means of drive assembly 38 depicted in FIG. 3 that may, for example, utilize a reversible electric motor 40 and suitable reduction gearing 42 connected to drive shaft 30 of drum 20 in order to drive the drum in a selected direction. It is preferable to use a heavy duty chain 44 passing over sprockets 46, 48 for transferring the rotation of the motor to the drive shaft, in the arrangement shown in FIGS. 3 and 5.

By placing drum 20 within pressure vessel 12, it is possible to have the same advantages of unobstructed agitation of materials in the drum as could be achieved in a freestanding drum. By designing the drum to have adequate containing walls the materials being processed and the additives to be inserted into the materials a container within the drum during processing. Because the drum is disposed within a pressure vessel, the materials of construction of the drum are considerably lighter than are required for a free standing rotatable drum which would have required the structural integrity to withstand the forces of pressure as well as the forces associated with vacuum that is utilized from time to time in the process.

The interior of drum 20 is equipped with a series of paddles 50 and a helical flighting 52 affixed to the drum sidewall 21 (FIG. 9) in order to facilitate agitation and movement of the material being processed as a consequence of rotation of drum 20. The lifting paddles and the flighting move the material as described in more detail below.

Vessel 12 and drum 20 in accordance with the invention, are preferably operated on an incline. The preferred angle of incline is from about 7° from the horizontal with the front or inlet end of the apparatus being higher than the closed or lower end. The angle of inclination 15 aids in containing the materials to be processed within the drum and that the fiber will be moved through the drum toward the back end at least partially under influence of gravity as the drum is rotated. The drum may be of any suitable size it being noted that a typical size may be approximately 10 feet long. It is possible of course, to use larger units or a continuous unit and the processor is appropriately sized to the facility in which it will be used.

Lifting paddles 50 are mounted on the interior of drum 20 and arranged as to minimize any obstruction of flow of materials within the drum. The lifting paddles are distributed in sections along the horizontal dimension of the drum as shown in FIG. 7 and are staggered approximately 45° from one another.

Figure 7:
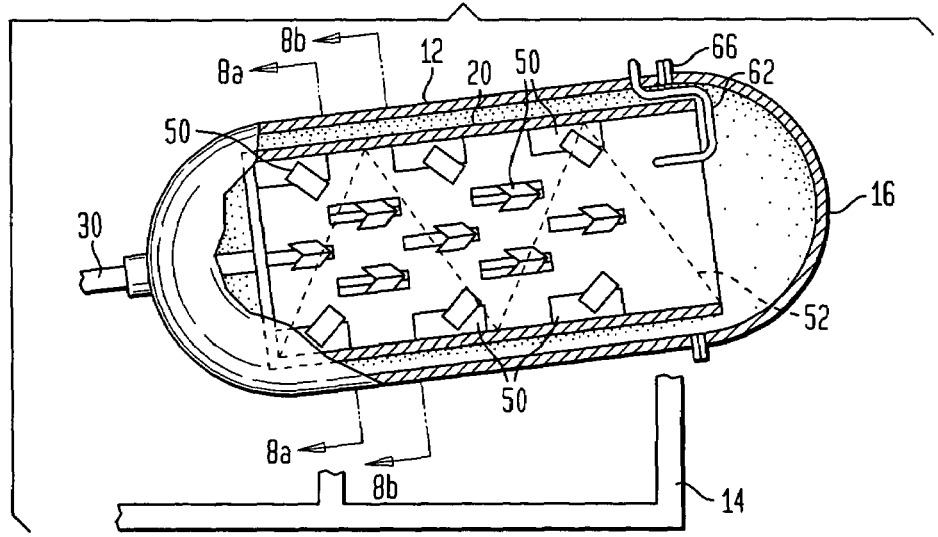
FIG. 7 is a side elevational view of the apparatus of FIG. 3, in partial section, showing lifting paddles disposed in a spaced array around the interior of the rotating drum with the location of a helical baffle indicated by the use of dashed lines.
Figure 8A:
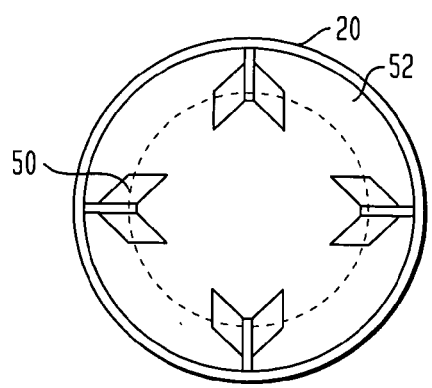
FIG. 8A is a cross sectional view taken along line 8A-8A of FIG. 7.
Figure 8B:
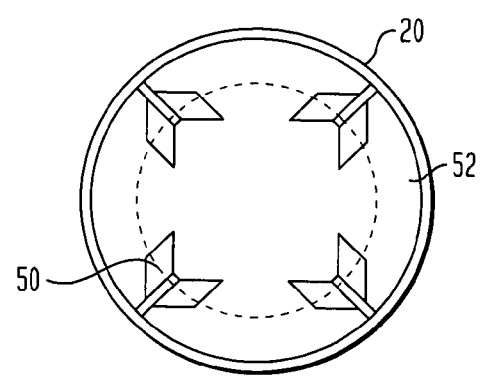
FIG. 8B is a cross sectional view taken along line 8B-8B of FIG. 7.
Figure 9:
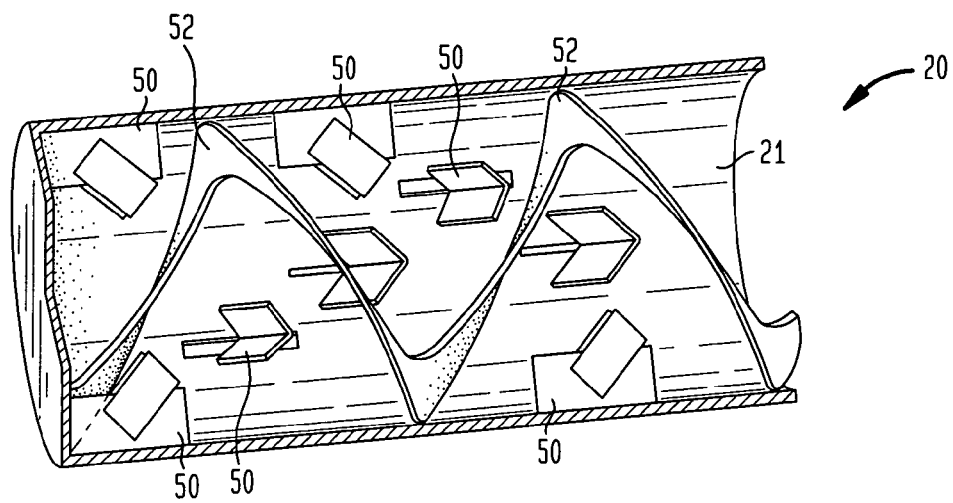
FIG. 9 indicates the relationship of the lifting paddles to the helical baffle disposed around the interior surface of the rotating drum of the pressure vessel of FIG. 3.

Lifting paddles 50 are fixed to the interior sidewall 21 of drum 20 perpendicular to the shell of the drum as will be appreciated from FIGS. 8A and 8B and are oriented lengthwise to correspond to the longitudinal dimensions of the drum as shown in FIGS. 7 and 9.

The helical flighting or baffle 52 is affixed to the interior perimeter of drum 20 also on sidewall 21 so as to minimize obstruction of flow of materials within the drum and preferably at a frequency corresponding to one complete cycle of the helix in a distance equal to the diameter of the drum measured along the length of the drum. The angularity of the helical flighting is such that when the drum 20 is rotated in what is called a first rotated direction, the materials to be processed are moved forward towards the closed lower end 54 of the vessel, where as rotation of the second rotated direction causes the materials to be moved backward toward the inlet opening 24 of the drum. The helical flighting is continuous, meaning that the occasional lifting paddles 50 must be eliminated in certain locations in order to make fabrication possible. The size and frequency of the lifting paddles, the angle of incline of the drum and the rate of rotation of the drum are variable and are a function of the required movement of materials within the drum and the amount of material to be processed in a given amount of time. The diameter of the drum needs to be sufficient to accept a selected quantity of material to be processed with an additional space of approximately 40 percent of the volume of the interior diameter of the drum needed to remain vacant so as to allow the materials to tumble within the drum as it rotates. In a design of this type of device additional processing capacities added to the processor by increasing its length. The ratio of diameter length is variable and depends upon the amount of material to be processed in a given amount of time in concert with the size and frequency of the agitation mechanisms of the drum to ensure complete mixing. Devices for monitoring and controlling the process include water piping, steam piping, vacuum piping, pressure controllers and other needed instruments. In using a free standing, rotatable drum, each of these devices requires that they be affixed to the center line of the axis of the rotatable drum which complicates the closure device on such a vessel and, by necessity, places these devices at the ends of the drum. Such arrangement is clumsy, at best, and makes it very difficult to design a practical unit. On the other hand, the use of a stationary pressure vessel as is described and illustrated herein facilitates convenient construction and operation of the device.

With reference to FIG. 3, vessel 12 is equipped with piping 56 for the addition of steam and piping 58 for the selective addition of water with suitable valves being utilized to control the flow. The steam piping and water piping are combined into a single injection pipe 60 as shown in FIG. 3, enabling steam and water to be conducted through the sidewall of vessel 12 and then injected into the open end of drum 20 through a curved fixed pipe 62.

Figure 10:
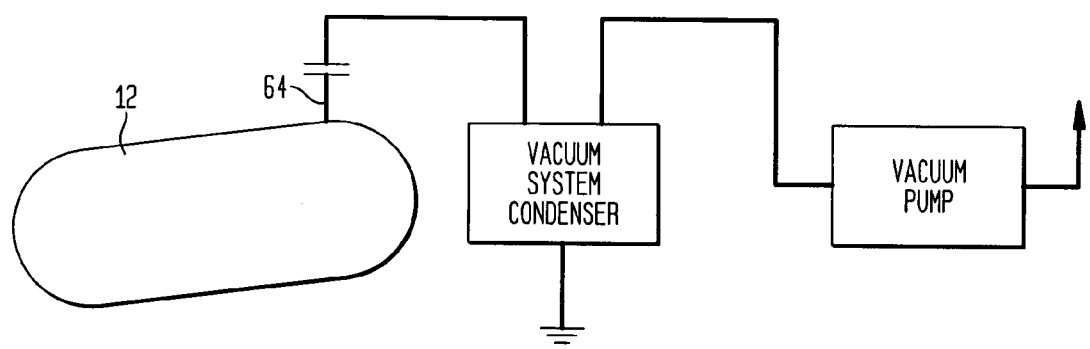
FIG. 10 is a schematic diagram of a vacuum system used in connection with the present invention.

During one phase of operation of the device, vacuum is induced into the vessel 12 (and thus drum 20) by a vacuum system such as the type manufactured by Nash Engineering Company of Norwalk, Conn. or Croll-Reynolds Company, Inc. of Westfield, N.J. connected to the vessel by vacuum connection 64; note FIG. 10. In accordance with the invention, fiber is carried by a suitable conveyor and introduced through the inlet opening 36 when door 16 has been moved to the open position and into the opening 24 of drum 20. Drum 20 is then rotated in the first rotated direction while the fiber is being conveyed into the drum and by virtue of the helical flighting 52 and the angle of incline of the drum the material is loaded for processing. When drum 20 has been filled with a sufficient amount of material to be processed door 16 is closed and secured by locking ring 66 such as the type manufactured by Klinge Products Company of Denmark. Steam and water are added as needed to control the consistency of the fiber being curled. This may be accomplished by injecting water through pipe 58 such as sufficient water is brought into contact with the fiber via curved stationary pipe 62. Moisture and steam are added to maintain a temperature and consistency at the desired level. Drum 20 is ordinarily rotated in the first rotated direction during loading and may also be rotated in the first rotated direction to enhance mixing of the material. In the first rotated direction, assumed to be clockwise and viewed from the open end of the drum, material is intercepted by directional flighting 52 and is moved through the drum toward the back or closed lower end 28 of the drum. The lifting paddles, by virtue of the angular portion of each paddle direct a portion of the waste material countercurrently toward the inlet of the drum as each of the paddles comes in contact with the material during rotation. This simultaneous back and forward movement of the material within the drum by the action of flighting 52 and the surfaces of lifting paddles 50 during rotation of the drum is believed to enhance the mixing and curling operation.

Heat is added to the vessel during processing of the fiber. Heat is advantageously added in the form of steam by way of piping 56 and injected into the fiber by injection pipe 60 while the drum is being rotated in the first rotative direction; note FIG. 3. As a high pressure is maintained in the vessel 12 and drum 20 by suitable use of the valves and pressure control system associated with pressure pipe 68 and then connection 70. Valve 72 controls the pressure pipe and valve 74 controls vent pipe 76. Pipe 76 forms a connection to the interior of vessel 12.

The inventive process and products may be prepared by a variety of processes using different equipment. It has been found, for example, that curl can be imparted in a Quantum mixer. The curl index (Lw) for secondary fiber was increased, for example, from 0.52 to 0.235 by treatment at about 275° F. in steam. Likewise, one might utilize, for example, a turbopulper available from Corner SA (Italy) to practice the inventive process. Such pressure vessels are generally spherical and include an internal agitator.

Figure 11:
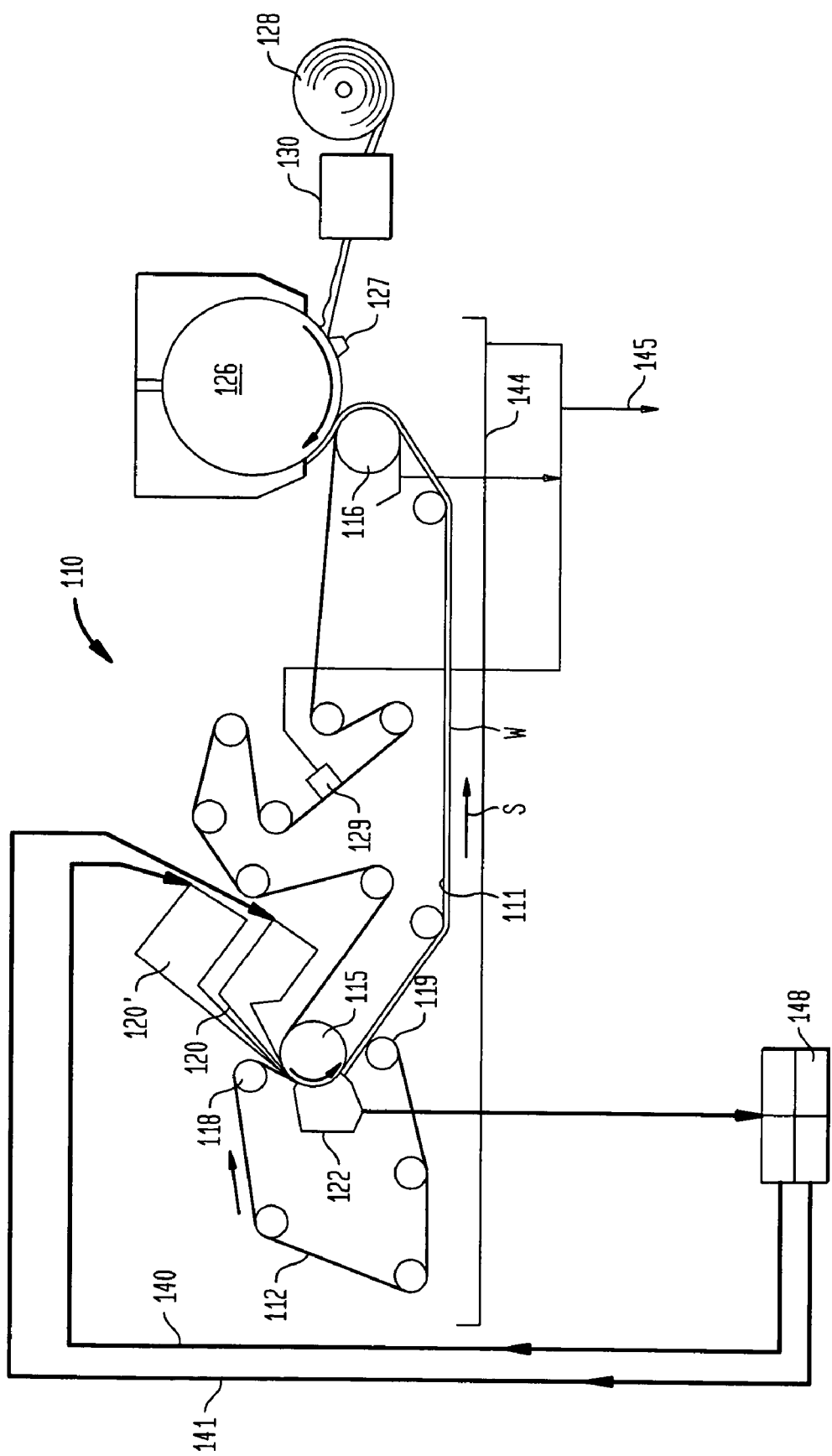
FIG. 11 is a schematic diagram of a papermaking machine useful for the practice of the present invention.

Following removal from rotoclave 10 or other suitable pressure vessel, the curled fiber is suitably provided to a papermaking machine to make absorbent sheet. FIG. 11 illustrates schematically a suitable apparatus where a machine chest 148, which may be compartmentalized, is used for preparing furnishes that are treated with chemicals having different functionality depending on the character of the various fibers used. This embodiment shows two head boxes thereby making it possible to produce a stratified product. The product according to the present invention can be made with single or multiple head boxes and regardless of the number of head boxes may be stratified or unstratified. The treated furnish is transported through different conduits 140 and 141, where they are delivered to the head box 120, 120' (indicating an optionally compartmented headbox) of a crescent forming machine 110.

FIG. 11 shows a web-forming end or wet end with a liquid permeable foraminous support member 111 which may be of any conventional configuration. Foraminous support member 111 may be constructed of any of several known materials including photopolymer fabric, felt, fabric, or a synthetic filament woven mesh base with a very fine synthetic fiber batt attached to the mesh base. The foraminous support member 111 is supported in a conventional manner on rolls, including breast roll 115 and couch or pressing roll, 116.

Forming fabric 112 is supported on rolls 118 and 119 which are positioned relative to the breast roll 115 for pressing the press wire 12 to converge on the foraminous support member 11. The foraminous support member 111 and the wire 112 move in the same direction and at the same speed which is in the direction of rotation of the breast roll 115. The pressing wire 112 and the foraminous support member 111 converge at an upper surface of the forming roll 115 to form a wedge-shaped space or nip into which one or more jets of water or foamed liquid fiber dispersion (furnish) provided by single or multiple headboxes 120, 120' is pressed between the pressing wire 112 and the foraminous support member 111 to force fluid through the wire 112 into a saveall 122 where it is collected to reuse in the process.

The nascent web, W, formed in the process is carried by the foraminous support member 111 to the pressing roll 116 where the nascent web, W, is transferred to the drum 126 of a Yankee dryer. Fluid is pressed from the web, W, by pressing roll 116 as the web is transferred to the drum 126 of a dryer where it is partially dried and preferably wet-creped by means of an undulatory creping blade 127. The wet-creped web is then transferred to an after-drying section 130 prior to being collected on a take-up roll 128. The drying section 130 may include through-air dryers, impingement dryers, can dryers, another Yankee dryer and the like as is well known in the art and discussed further below.

A pit 144 is provided for collecting water squeezed from the furnish by the press roll 116 and a Uhle box 129. The water collected in pit 144 may be collected into a flow line 145 for separate processing to remove surfactant and fibers from the water and to permit recycling of the water back to the paper-making machine 110.

An absorbent paper web can is made by dispersing fibers into aqueous slurry and depositing the aqueous slurry onto the forming wire of a papermaking machine. Any suitable forming scheme might be used. For example, an extensive but non-exhaustive list includes a crescent former, a C-wrap twin wire former, an S-wrap twin wire former, a suction breast roll former, a Fourdrinier former, or any art-recognized forming configuration. The forming fabric can be any suitable foraminous member including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808 all of which are incorporated herein by reference in their entirety. One forming fabric particularly useful with the present invention is Voith Fabrics Forming Fabric 2164 made by Voith Fabrics Corporation, Shreveport, La.

Foam-forming of the aqueous furnish on a forming wire or fabric may be employed as a means for controlling the permeability or void volume of the sheet upon wet-creping. Suitable foam-forming techniques are disclosed in U.S. Pat. No. 4,543,156 and Canadian Patent No. 2,053,505, the disclosures of which are incorporated herein by reference.

Figure 12:
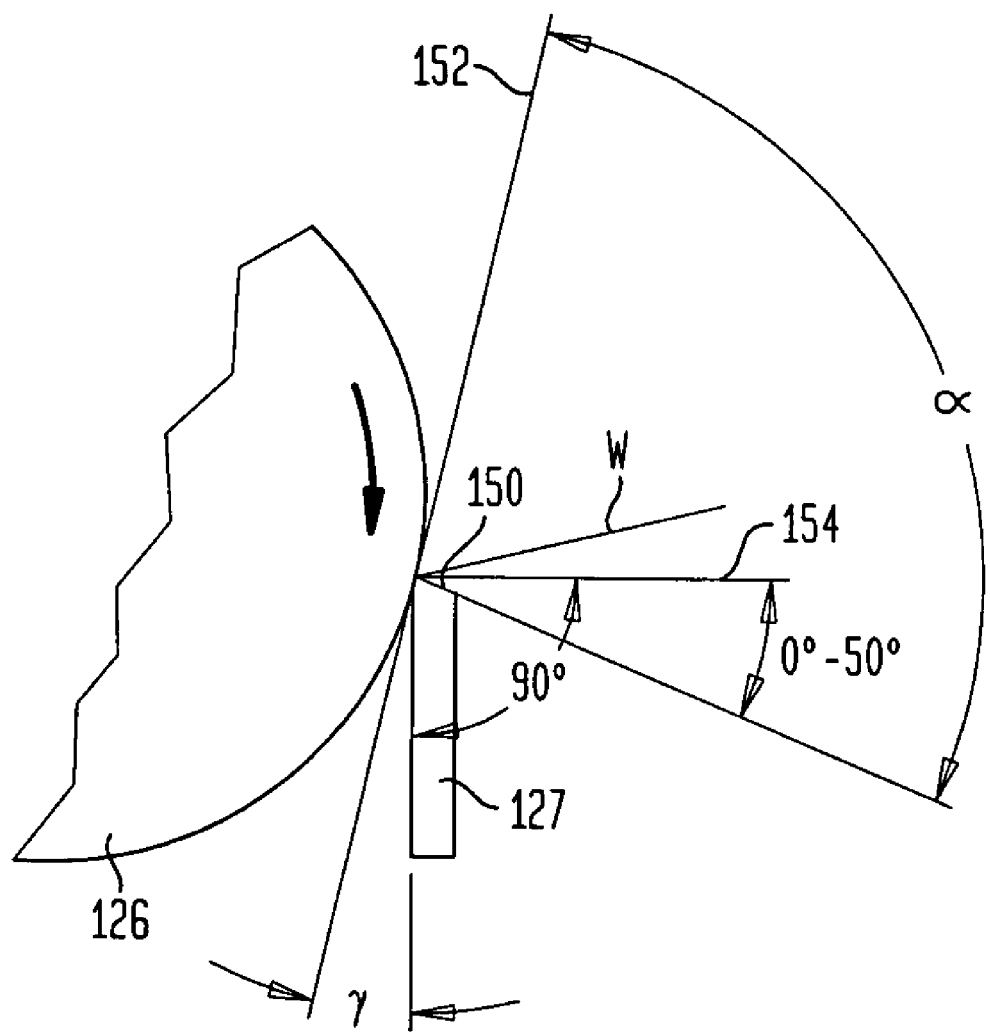
FIG. 12 is a schematic diagram illustrating various characteristic angles of a creping process.
Figure 13A:
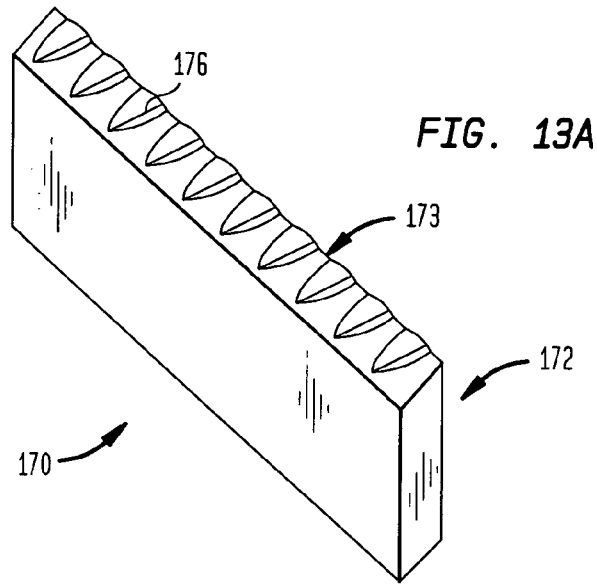
FIGS. 13A-13D are schematic diagrams illustrating the geometry of an undulatory creping blade utilized in accordance with the present invention.
Figure 13B:
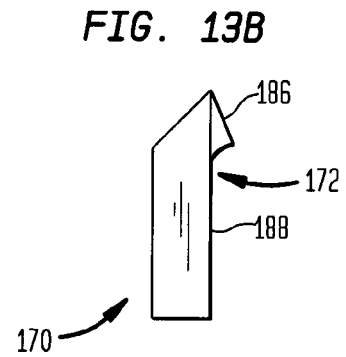
Figure 13C:
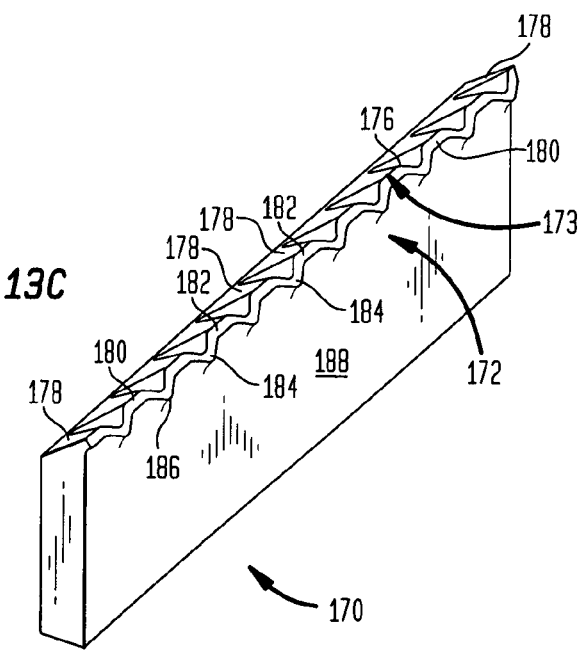
Figure 13D:
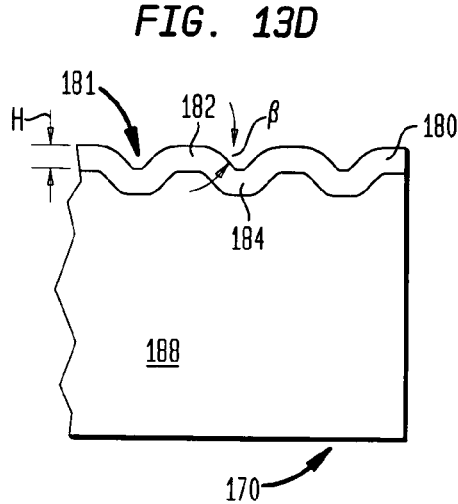

The creping angle and blade geometry may be employed as means to influence the sheet properties. Referring to FIG. 12, the creping angle or pocket angle, $\alpha$, is the angle that the creping rake surface 150 makes with a tangent 152 to a Yankee dryer at the line of contact of the creping blade 127 with the rotating cylinder 126 as in FIG. 11. So also, an angle $\gamma$ is defined as the angle the blade body makes with tangent 152, whereas the bevel angle of creping blade 127 is the angle surface 150 defines with a perpendicular 154 to the blade body as shown in the diagram. Referring to FIG. 12, the creping angle is readily calculated from the formula:

$$\alpha = 90 + \text{blade bevel angle} - \gamma$$

for a conventional blade. These parameters vary over the creping surface of an undulatory blade as discussed herein.

In accordance with the present invention, creping of the paper from a Yankee dryer is carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes effected by use of the undulatory blade tend to correlate with improved softness perception of the tissue products. These blades, together with high-lignin pulps, cooperate to provide unexpected and, indeed, dramatic synergistic effect as discussed in connection with the examples below.

FIGS. 13A through 13D illustrate a portion of a preferred undulatory creping blade 170 useable in the practice of the present invention in which a relief surface 172 extends indefinitely in length, typically exceeding 100 inches in length and often reaching over 26 feet in length to correspond to the width of the Yankee dryer on the larger modern paper machines. Flexible blades of the patented undulatory blade having indefinite length can suitably be placed on a spool and used on machines employing a continuous creping system. In such cases the blade length would be several times the width of the Yankee dryer. In contrast, the height of the blade 170 is usually on the order of several inches while the thickness of the body is usually on the order of fractions of an inch.

As illustrated in FIGS. 13A through 13D, an undulatory cutting edge 173 of the patented undulatory blade is defined by serrations 176 disposed along, and formed in, one edge of the surface 172 so as to define an undulatory engagement surface. Cutting edge 173 is preferably configured and dimensioned so as to be in continuous undulatory engagement with Yankee 126 when positioned as shown in FIG. 12, that is, the blade continuously contacts the Yankee cylinder in a sinuous line generally parallel to the axis of the Yankee cylinder. In particularly preferred embodiments, there is a continuous undulatory engagement surface 180 having a plurality of substantially colinear rectilinear elongate regions 182 adjacent a plurality of crescent shaped regions 184 about a foot 186 located at the upper portion of the side 188 of the blade which is disposed adjacent the Yankee. Undulatory surface 180 is thus configured to be in continuous surface-to-surface contact over the width of a Yankee cylinder when in use as shown in FIGS. 11 and 12 in an undulatory or sinuous wave-like pattern.

The number of teeth per inch may be taken as the number of elongate regions 182 per inch and the tooth depth is taken as the height, H, of the groove indicated at 181 adjacent surface 188.

Several angles are used in order to describe the geometry of the cutting edge of the undulatory blade of the patented undulatory blade. To that end, the following terms are used:

Creping angle "α"—the angle between a rake surface 178 of the blade 170 and the plane tangent to the Yankee at the point of intersection between the undulatory cutting edge 173 and the Yankee;

Axial rake angle "β"—the angle between the axis of the Yankee and the undulatory cutting edge 173 which is the curve defined by the intersection of the surface of the Yankee with indented rake surface of the blade 170;

Relief angle "γ"—the angle between the relief surface 172 of the blade 170 and the plane tangent to the Yankee at the intersection between the Yankee and the undulatory cutting edge 173, the relief angle measured along the flat portions of the present blade is equal to what is commonly called "blade angle" or holder angle", that is "γ" in FIG. 12.

Quite obviously, the value of each of these angles will vary depending upon the precise location along the cutting edge at which it is to be determined. The remarkable results achieved with the undulatory blades of the patented undulatory blade in the manufacture of the absorbent paper products are due to those variations in these angles along the cutting edge. Accordingly, in many cases it will be convenient to denote the location at which each of these angles is determined by a subscript attached to the basic symbol for that angle. As noted in the '788 patent, the subscripts "f", "c" and "m" refer to angles measured at the rectilinear elongate regions, at the crescent shaped regions, and the minima of the cutting edge, respectively. Accordingly, "$\gamma_f$", the relief angle measured along the flat portions of the present blade, is equal to what is commonly called "blade angle" or "holder angle". In general, it will be appreciated that the pocket angle $\alpha_f$ at the rectilinear elongate regions is typically higher than the pocket angle $\alpha_c$ at the crescent shaped regions.

While the products of the invention may be made by way of a dry-crepe process, a wet crepe process is preferred in some embodiments, particularly with respect to single-ply towel in some cases. When a wet-crepe process is employed, after-drying section 130 may include an impingement air dryer, a through-air dryer, a Yankee dryer or a plurality of can dryers. Impingement air dryers are disclosed in the following patents and applications, the disclosure of which is incorporated herein by reference:

U.S. Pat. No. 5,865,955 of Ilvespaaet et al.
U.S. Pat. No. 5,968,590 of Ahonen et al.
U.S. Pat. No. 6,001,421 of Ahonen et al.
U.S. Pat. No. 6,119,362 of Sundqvist et al.
U.S. patent application Ser. No. 09/733,172, entitled Wet Crepe, Impingement-Air Dry Process for Making Absorbent Sheet, now U.S. Pat. No. 6,432,267; (FJ-99-33).

Figure 14:
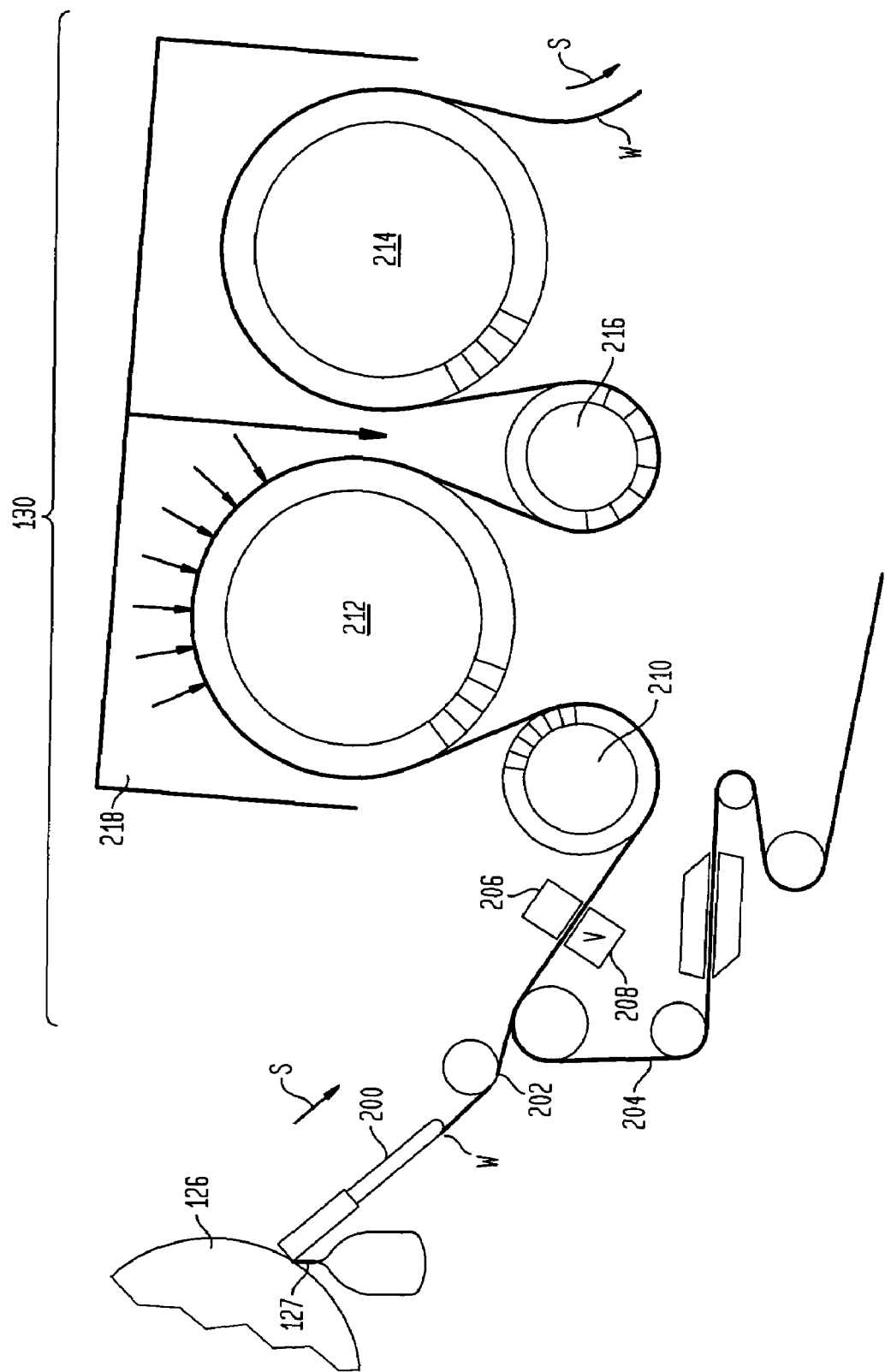
FIG. 14 is a schematic diagram of an impingment air drying section of a paper machine used to dry a wet-creped web.

When an impingement-air after dryer is used, after drying section 130 of FIG. 11 may have the configuration shown in FIG. 14.

There is shown in FIG. 14 an impingement air dry apparatus 130 useful in connection with the present invention. The web is creped off of a Yankee dryer, such as Yankee dryer 126 of FIG. 11 utilizing a creping blade 127. The web W is aerodynamically stabilized over an open draw utilizing an air foil 200 as generally described in U.S. Pat. No. 5,891,309 to Page et al., the disclosure of which is incorporated herein by reference. Following a transfer roll 202, web, W, is disposed on a transfer fabric 204 and subjected to wet shaping by way of an optional blow box 206 and vacuum shoe 208. The particular conditions and impression fabric selected depend on the product desired and may include conditions and fabrics described above or those described or shown in one or more of: U.S. Pat. No. 5,510,002 to Hermans et al.; U.S. Pat. No. 4,529,480 of Trokhan; U.S. Pat. No. 4,102,737 of Morton and U.S. Pat. No. 3,994,771 to Morgan, Jr. et al., the disclosures of which are hereby incorporated by reference into this section.

After wet shaping, web, W, is transferred over vacuum roll 210 impingement air-dry system as shown. The apparatus of FIG. 14 generally includes a pair of drilled hollow cylinders 212, 214, a vacuum roll 216 therebetween as well as a hood 218 equipped with nozzles and air returns. In connection with FIG. 14 it should be noted that transfer of a web, W, over an open draw needs to be stabilized at high speeds. Rather than use an impingement-air dryer, after-dryer section 130 of FIG. 14 may include instead of cylinders 212, 214 a throughdrying unit as is well known in the art and described in U.S. Pat. No. 3,432,936 to Cole et al., the disclosure of which is incorporated herein by reference.

Yet another after-drying section is disclosed in U.S. Pat. No. 5,851,353 which may likewise be employed in a wet-creped process using the apparatus of FIG. 11.

Figure 15:
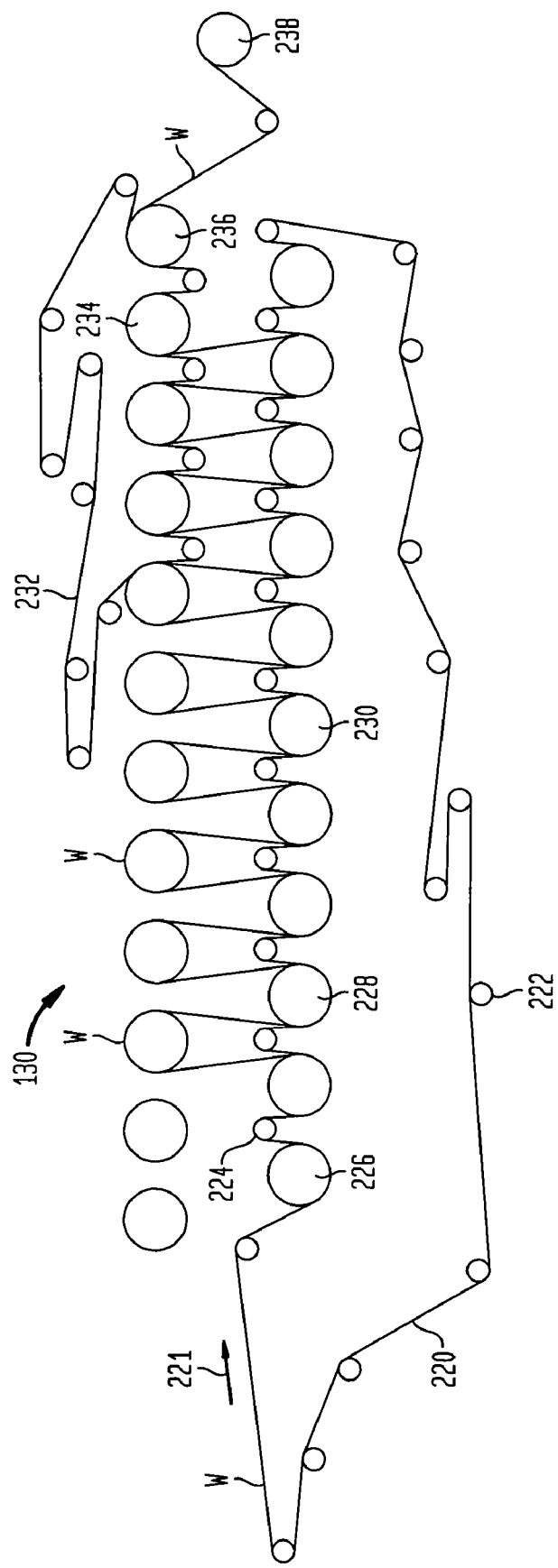
FIG. 15 is a schematic diagram of a can drying section of a paper machine used to dry a wet-creped web.

Still yet another after-drying section 130 is illustrated schematically in FIG. 15. After creping from the Yankee cylinder the web, W, is deposited on an after-dryer felt 220 which travels in direction 221 and forms an endless lop about a plurality of after-dryer felt rolls such as rolls 222, 224 and a plurality of after-dryer drums such as drums (sometimes referred to as cans) 226, 228 and 230.

A second felt 232 likewise forms an endless loop about a plurality of after-dryer drums and rollers as shown. The various drums are arranged in two rows and the web is dried as it travels over the drums of both rows and between rows as shown in the diagram. Felt 232 carries web, W, from drum 234 to drum 236, from which web, W, may be further processed or wound up on a take-up reel 238.

The curled fiber of the invention may also be utilized in an uncreped throughdry process for making absorbent sheet as is disclosed in U.S. Pat. No. 5,932,068 to Farrington et al., the disclosure of which is incorporated herein by reference.

EXAMPLES 1-21

Following generally the procedures noted above a rotoclave of the general class shown in FIGS. 3-10 was used to repulp paper and provide it with a durable curl. The particular machine had a roughly five foot diameter, was 12 feet in length and had a 258 cubic foot volume as well as a 12 rpm maximum rotational speed. The rotoclave operating conditions and materials tested are summarized in Table 1. Each batch was run with 200 pounds of paper at 20 percent consistency for one hour. Three of the waste paper grades defibered very well after one hour at temperature in the rotoclave. The single sided poly (SSP) required 90 minutes to completely defiber while the double sided poly (DSP) required three hours and one percent caustic and was still poorly defibered. The curling data in Table 2 shows that the rotoclave is very effective in imparting permanent curl to the fibers. The curl increased from an average curl index of 0.074 to 0.278. The rotoclave was very effective at curling fibers regardless of their length. The shortest fibers (high gloss coated book, HGCB) with a weight average fiber length of 1.43 had a curl index of 0.268. The waste paper pulps were used to make commercial wet creped towel using a conventional wet press process using a papermachine as described above. A trial consisted of 15 cells with each waste paper run at two different blend ratios with secondary fiber. The furnish blends for the various cells is summarized in Table 3.

TABLE 1

Operating Conditions

| | | Example 1 | Example 2 | Example 3 | Example 4 | Example 5 |
|---|---|---|---|---|---|---|
| Waste Paper Grade | | PC-PWE Post Consumer-Poly Window Env. | SSP Single Sided Poly | HGCB High Gloss Coated Book | DSP-FC Double Sided Poly | PolyCBC Poly Coated Book Covers (Maths Book) |
| Paper | lbs | 200 | 200 | 200 | 200 | 200 |
| Water | lbs | 800 | 800 | 800 | 800 | 800 |
| Cons (calc.) | % | 20% | 20% | 20% | 20% | 20% |
| Chemistry | | None | None | None | 1% Caustic (after 120 min.) | None |
| Operating Conditions | | | | | | |
| Speed | rpm | 5 | 7 | 11 | 11 | 5 |
| Time at Temp | min | 60 | 90 | 60 | 180 | 60 |
| Pressure | psi | 45 | 34 | 34 | 23 | 50 |
| Temperature at start of cycle | | 125 deg C. 257 deg C. | 121 deg C. | 121 deg C. | 121 deg C. | 132 deg C. 270 deg F. |

TABLE 2

Fiber Properties

| | | FQA Fiber Length | | FQA Fiber Curl | |
|---|---|---|---|---|---|
| Sample | Description | Lw | Lz | Ln | Lw |
| PC-PWE | As Received | 1.16 | 1.93 | 0.046 | 0.052 |
| | Rotoclaved | 0.86 | 1.58 | 0.214 | 0.251 |
| | Screened | 0.73 | 1.25 | 0.177 | 0.212 |
| High Gloss Coated Book | As Received | 1.17 | 1.94 | 0.087 | 0.095 |
| | Rotoclaved | 0.85 | 1.60 | 0.237 | 0.277 |
| | Screened | 0.90 | 1.55 | 0.210 | 0.243 |
| Poly Coated Book Cover | As Received | 0.92 | 1.43 | 0.071 | 0.077 |
| | Rotoclaved | 0.85 | 1.51 | 0.228 | 0.268 |
| | Screened | 1.02 | 1.70 | 0.198 | 0.239 |
| SSP | As Received | 1.20 | 1.98 | 0.071 | 0.076 |
| | Rotoclaved | 1.07 | 2.12 | 0.254 | 0.291 |
| | Screened | 1.20 | 2.12 | 0.261 | 0.304 |
| DSP | As Received | 1.66 | 2.64 | 0.060 | 0.072 |
| | Rotoclaved | 1.03 | 1.89 | 0.260 | 0.302 |
| | Screened | 1.44 | 2.15 | 0.244 | 0.285 |

TABLE 3

Absorbent Sheet Compositions

| Example | % Recycle (uncurled) | % BCTMP | % Curled | Wastepaper |
|---|---|---|---|---|
| 6 | 77 | 33 | — | — |
| 7 | 33 | 66 | — | — |
| 8 | 33 | 66 | — | — |
| 9 | 50 | — | 50 | HGCB |
| 10 | 100 | — | — | — |
| 11 | 100 | — | — | — |
| 12 | 80 | — | 20 | HGCB |
| 13 | 100 | — | — | — |
| 14 | 50 | — | 50 | HGCB |
| 15 | 80 | — | 20 | PCBC |
| 16 | 50 | — | 50 | PCBC |
| 17 | 50 | — | 50 | DSP |
| 18 | 80 | — | 20 | DSP |
| 19 | — | — | 100 | DSP |
| 20 | 50 | — | 50 | SSP |
| 21 | — | — | 100 | SSP |

Figure 16:
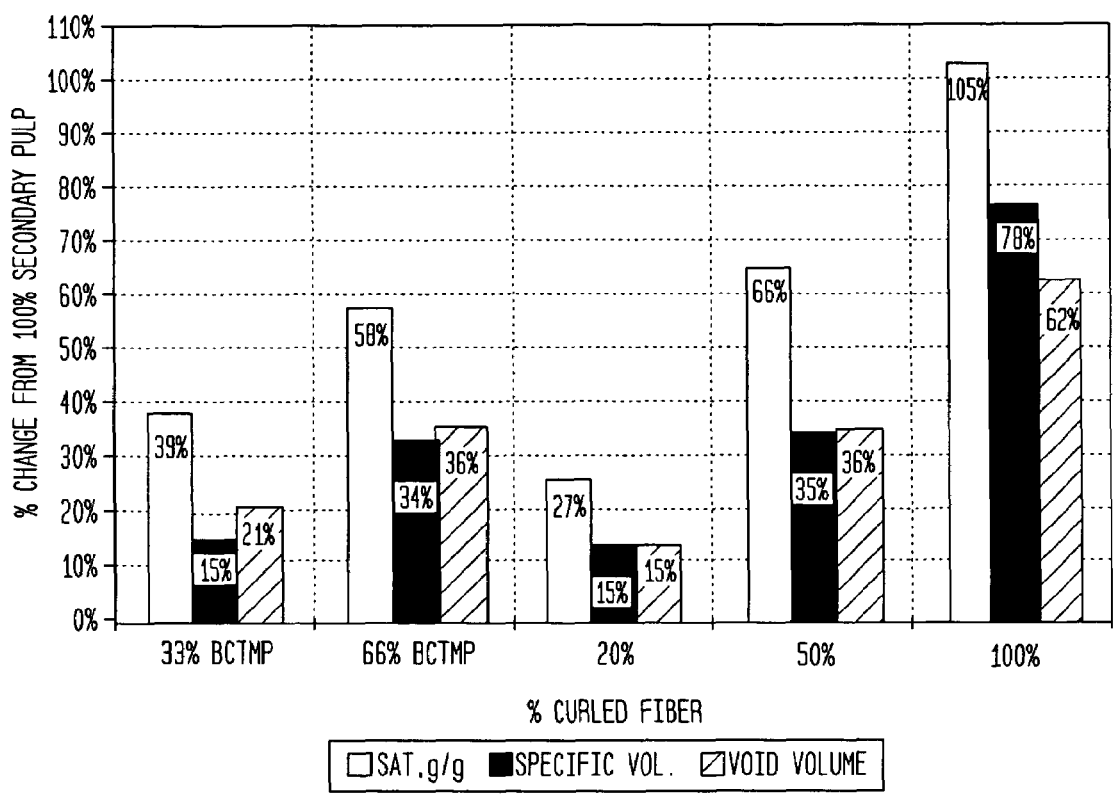
FIG. 16-18 are histograms of absorbent sheet properties for various sheet compositions.
Figure 17:
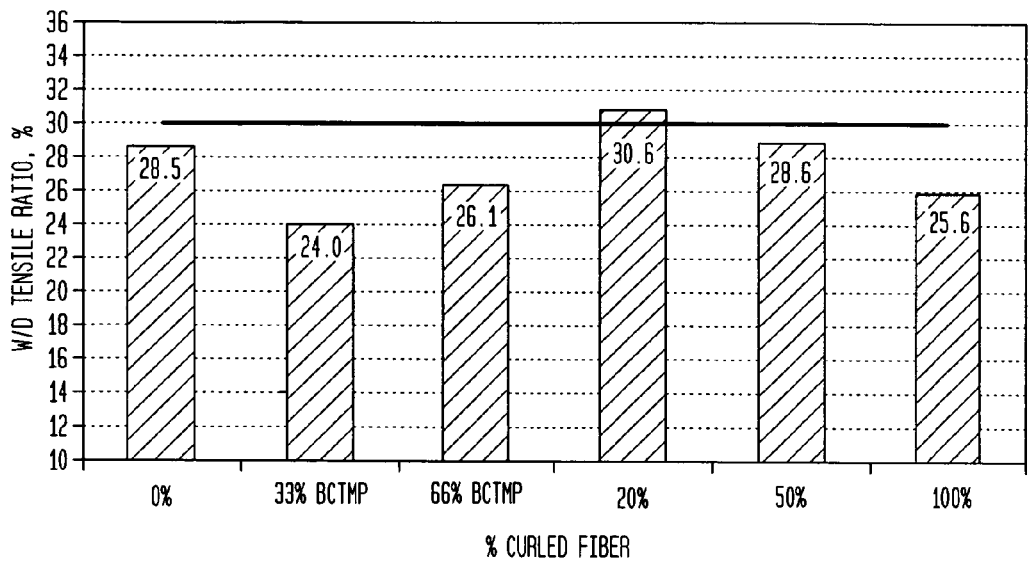
Figure 18:
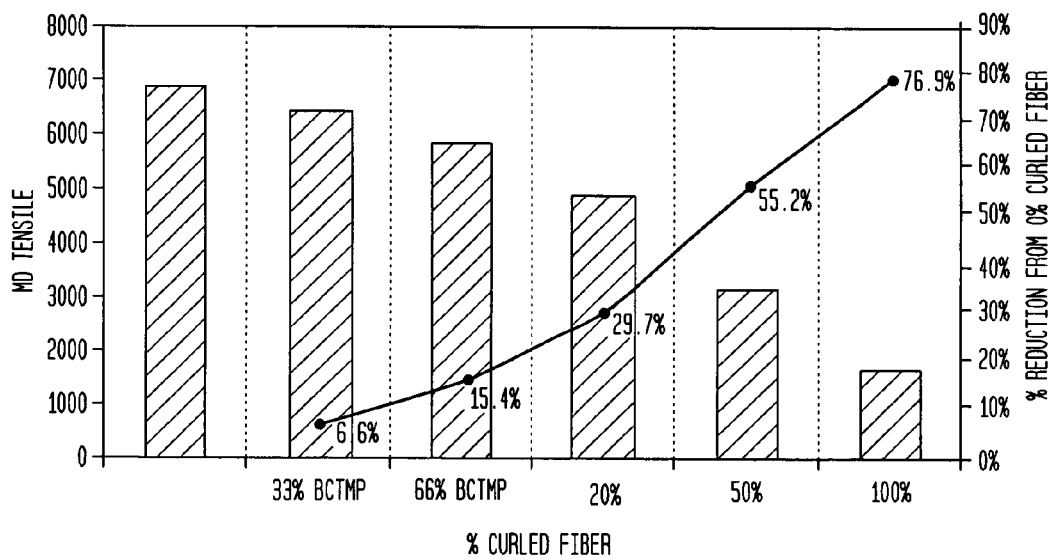

Physical and performance testing results appear in FIGS. 16-18 for the towel.

Results shown in the Figures are also tabulated on Table 4.

TABLE 4

Absorbent Sheet

| Example | Pulp | SAT Slow Rate Times | Basis Weight lb/3000 ft^2 | Caliper 8 Sheet mils/8 sht | Tensile MD g/3 in | Stretch MD % | Tensile CD g/3 in | Wet Tens Finch Cured-CD g/3 in | Wet/Dry Tensile Ratio |
|---|---|---|---|---|---|---|---|---|---|
| 10 | 100 Secondary | 891.7 | 27.3 | 50.6 | 6653 | 14.5 | 3499 | 1154 | 33.0% |
| 11 | 100 Secondary | 1,022.7 | 27.3 | 49.3 | 6065 | 12.8 | 3802 | 988 | 26.0% |
| 12 | 100 Secondary | 818.7 | 28.1 | 50.5 | 7719 | 14.7 | 3994 | 1061 | 26.6% |
| 6 | 66/33 BCTMP | 1,165.7 | 25.3 | 53.1 | 5639 | 12.9 | 3624 | 870 | 24.0% |
| 6 | 66/33 BCTMP | 681.7 | 30.7 | 71.4 | 7082 | 11.2 | 4595 | 1030 | 22.4% |
| 7 | 33/66 BCTMP | 466.7 | 27.9 | 74.8 | 5111 | 10.8 | 3753 | 798 | 21.3% |
| 8 | 33/66 BCTMP | 1,362.4 | 28.6 | 69.6 | 6421 | 11.6 | 4545 | 1184 | 26.1% |
| 9 | 50/50 HGCB | 1,114.3 | 27.9 | 60.5 | 4101 | 14.9 | 2983 | 735 | 24.6% |
| 12 | 80/20 HGCB | 729.3 | 24.6 | 47.9 | 4806 | 14.2 | 3054 | 933 | 30.6% |
| 14 | 50/50 HGCB | 1,122.0 | 25.3 | 59.9 | 2454 | 12.2 | 2327 | 697 | 30.0% |
| 15 | 80/20 PCBC | 1,334.4 | 24.7 | 45.3 | 5187 | 14.4 | 4540 | 1314 | 29.0% |
| 16 | 50/50 PCBC | 964.7 | 24.4 | 64.5 | 1948 | 12.7 | 1796 | 612 | 34.1% |
| 17 | 50/50 DSP | 1,778.7 | 25.0 | 59.1 | 2947 | 12.4 | 2620 | 773 | 29.5% |

TABLE 4-continued

| | | | | Absorbent Sheet | | | | | |
|---|---|---|---|---|---|---|---|---|---|
| 18 | 80/20 DSP | 1,033.4 | 28.4 | 70.1 | 4380 | 11.5 | 3671 | 1186 | 32.3% |
| 19 | 0/100 DSP | 1,502.7 | 23.1 | 66.8 | 1505 | 9.8 | 1698 | 383 | 22.6% |

| Example | Description | Pulp | SAT Slow Rate Times | Basis Weight lb/3000 ft^2 | Caliper 8 Sheet mils/ 8 sht | Tensile MD g/3 in | Stretch MD % | Tensile CD g/3 in | Wet Tens Finch Cured-CD g/3 in | Wet/Dry Tensile Ratio |
|---|---|---|---|---|---|---|---|---|---|---|
| 20 | 10/09/02 | 50/50 SSP | 304.7 | 29.9 | 82.7 | 3794 | 13.2 | 3085 | 767 | 24.9% |
| 21 | 10/09/02 | 0/100 SSP | 498.4 | 27.8 | 99.3 | 1646 | 12.9 | 1529 | 438 | 28.6% |
| Data Summary | | 100% Sys2 | | 27.6 | 50.1 | 6812 | 14.0 | 3765 | 1068 | 0.29 |
| | | 66/33 BCTMP | 1,165.7 | 25.3 | 53.1 | 5639 | 12.9 | 3624 | 870 | 24.0% |
| | | 66/33 BCTMP | 681.7 | 30.7 | 71.4 | 7082 | 11.2 | 4595 | 1030 | 22.4% |
| | | 33/66 BCTMP | 466.7 | 27.9 | 74.8 | 5111 | 10.8 | 3753 | 798 | 21.3% |
| | | 33/66 BCTMP | 1,362.4 | 28.6 | 69.6 | 6421 | 11.6 | 4545 | 1184 | 26.1% |
| | | 80/20 Curled | | 25.9 | 54.4 | 4791 | 13.4 | 3755 | 1145 | 30.6% |
| | | 50/50 Curled | | 26.5 | 65.4 | 3049 | 13.1 | 2562 | 717 | 28.6% |
| | | 0/100 Curled | | 25.4 | 83.0 | 1576 | 11.3 | 1613 | 410 | 25.6% |

| Example | Tensile Dry Ratio % | Water Abs Rate mLs | Tensile GM g/3 in. | Void Volume Wt Inc. % | Void Volume Ratio | SAT Cap., g/g | Specific Volume cc/g | % Change in Void Vol. | % Change in SAT, g/g | % Change in Spec. Vol. |
|---|---|---|---|---|---|---|---|---|---|---|
| 10 | 1.91 | 35.0 | 4811 | 382.8 | 2.01 | 3.18 | 3.62 | | | |
| 11 | 1.60 | 47.4 | 4793 | 359.5 | 1.89 | 3.23 | 3.53 | | | |
| 12 | 1.93 | 42.0 | 5552 | 379.3 | 2.00 | 3.01 | 3.50 | 373.86 | 3.14 | 3.55 |
| 6 | 1.58 | 12.5 | 4509 | 453.4 | 2.39 | 4.35 | 4.09 | 21.3% | 38.5% | 15.2% |
| 6 | 1.58 | 5.5 | 5687 | 502.5 | 2.64 | 4.66 | 4.53 | 34.4% | 48.4% | 27.7% |
| 7 | 1.37 | 7.7 | 4378 | 507.6 | 2.67 | 4.74 | 5.23 | 35.8% | 50.9% | 47.3% |
| 8 | 1.46 | 7.2 | 5373 | 509.3 | 2.68 | 4.97 | 4.75 | 36.2% | 58.4% | 33.9% |
| 9 | 1.38 | 7.0 | 3497 | 453.0 | 2.38 | 4.75 | 4.23 | 21.2% | 51.2% | 19.1% |
| 12 | 1.58 | 46.4 | 3826 | 416.1 | 2.19 | 3.06 | 3.80 | 11.3% | −2.5% | 6.9% |
| 14 | 1.05 | 9.7 | 2390 | 542.6 | 2.86 | 5.61 | 4.63 | 45.1% | 78.9% | 30.3% |
| 15 | 1.14 | 17.9 | 4852 | 397.0 | 2.09 | 4.12 | 3.58 | 6.2% | 31.4% | 0.8% |
| 16 | 1.09 | 10.0 | 1870 | 512.6 | 2.70 | 5.30 | 5.17 | 37.1% | 68.8% | 45.6% |
| 17 | 1.13 | 13.3 | 2778 | 546.3 | 2.88 | 6.08 | 4.62 | 46.1% | 93.6% | 30.1% |
| 18 | 1.20 | 7.0 | 4001 | 471.8 | 2.48 | 4.74 | 4.82 | 26.2% | 50.9% | 35.7% |

| Sample | Tensile Dry Ratio % | Water Abs Rate 0.1 mLs | Tensile GM g/3 in. | Void Volume Wt Inc. % | Void Volume Ratio | SAT Cap., g/g | Specific Volume cc/g | % Change in Void Vol. | % Change in SAT, g/g | % Change in Spec. Vol. |
|---|---|---|---|---|---|---|---|---|---|---|
| 19 | 0.89 | 4.7 | 1597 | 608.2 | 3.20 | 6.84 | 5.65 | 62.7% | 118.1% | 59.0% |
| 20 | 1.23 | 5.6 | 3419 | 490.0 | 2.58 | 4.33 | 5.40 | 31.1% | 38.1% | 52.0% |
| 21 | 1.08 | 1.8 | 1586 | 603.2 | 3.17 | 6.01 | 6.97 | 61.4% | 91.4% | 96.4% |
| Data Sum | 1.81 | 41.42 | 5052 | 373.9 | 1.97 | 3.14 | 3.55 | | | |
| | 1.58 | 12.5 | 4509 | 453.4 | 2.39 | 4.35 | 4.09 | 21.3% | 38.5% | 15.2% |
| | 1.58 | 5.5 | 5687 | 502.5 | 2.64 | 4.66 | 4.53 | 34.4% | 48.4% | 27.7% |
| | 1.37 | 7.7 | 4378 | 507.6 | 2.67 | 4.74 | 5.23 | 35.8% | 50.9% | 47.3% |
| | 1.46 | 7.2 | 5373 | 509.3 | 2.68 | 4.97 | 4.75 | 36.2% | 58.4% | 33.9% |
| | 1.31 | 23.75 | 4226 | 428.3 | 2.25 | 3.97 | 4.06 | 14.6% | 26.6% | 14.5% |
| | 1.18 | 9.10 | 2791 | 508.9 | 2.68 | 5.21 | 4.81 | 36.1% | 66.1% | 35.4% |
| | 0.98 | 3.20 | 1592 | 605.7 | 3.19 | 6.43 | 6.31 | 62.0% | 104.7% | 77.7% |

EXAMPLES 22-26

Figure 19:
FIG. 19 is a photomicrograph of a cross section of absorbent sheet made from BCTMP fiber.
Figure 20:
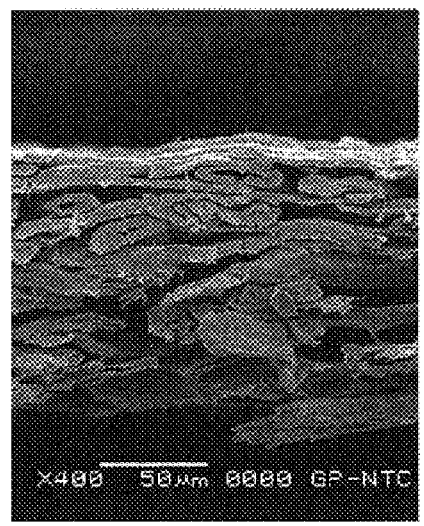
FIG. 20 is a photomicrograph of a cross section of absorbent sheet made from Southern Softwood Kraft fiber.
Figure 21:
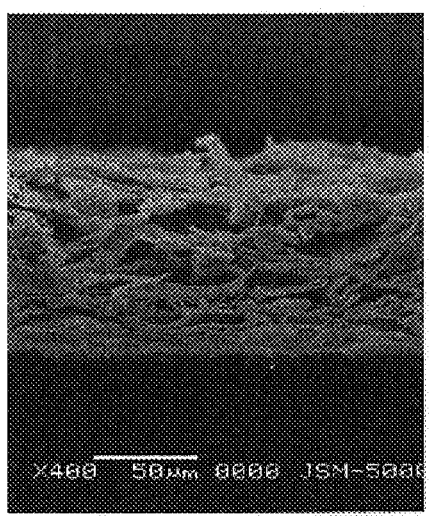
FIG. 21 is a photomicrograph of a cross section of absorbent sheet made from secondary (uncurled) fiber.
Figure 22:
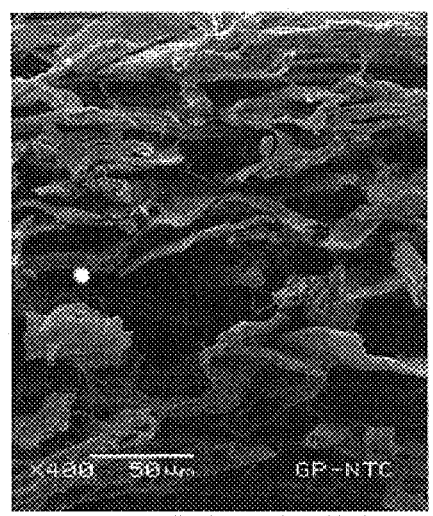
FIG. 22 is a photomicrograph of a cross section of absorbent sheet made from curled secondary fiber.

A series of handsheets were prepared using the fibers whose properties are enumerated in Table 5. The cross sections of the handsheets were then taken of the handsheets under magnification to show the difference in their morphology. FIG. 19 versus FIG. 20 demonstrates why BCTMP gives higher bulk than Southern Softwood Kraft (SSWK) even though they have the same coarseness. The lignin of the fiber wall makes the BCTMP fibers less conformable and less collapsible than Kraft. Coarseness does not tell the whole story for generating bulk and coarseness is not necessarily equivalent to fiber diameter. The aspect ratio of the fiber cross section is important as well. Generally speaking, the aspect ratio is defined as the ratio of the width of the fiber cross section to its height in the handsheet. A high aspect ratio indicates a high degree of collapse. With this definition and qualitative evaluation of the fibers in the photo the approximate aspect ratio of BCTMP is 2 while that for Southern Softwood Kraft (SSK) is 6. The secondary fiber aspect ratio is greater than 6; see FIG. 21 (untreated). It can be seen in FIG. 22 (treated) that the rotoclave process produces fibers that are not only more curly, that they also are more tubular as well and thus contribute more to the bulk and absorbency of the sheet.

TABLE 5

Fiber Properties

| Fiber Properties | Secondary | SSWK | SW BCTMP | HW BCTMP | Rotoclave SSP |
|---|---|---|---|---|---|
| Bulk, cc/g | 1.55 | 1.73 | 2.88 | 3.30 | — |
| Handsheet Tensile, Km | 3.4 | 2.3 | 2.9 | 0.8 | Low |
| Length, Lw, mm | 1.1 | 2.6 | 2.2 | 1.0 | 1.2 |
| Coarseness, mg/100 m | 12 | 22 | 23 | 17 | — |

EXAMPLES 27-29

Figure 23A:
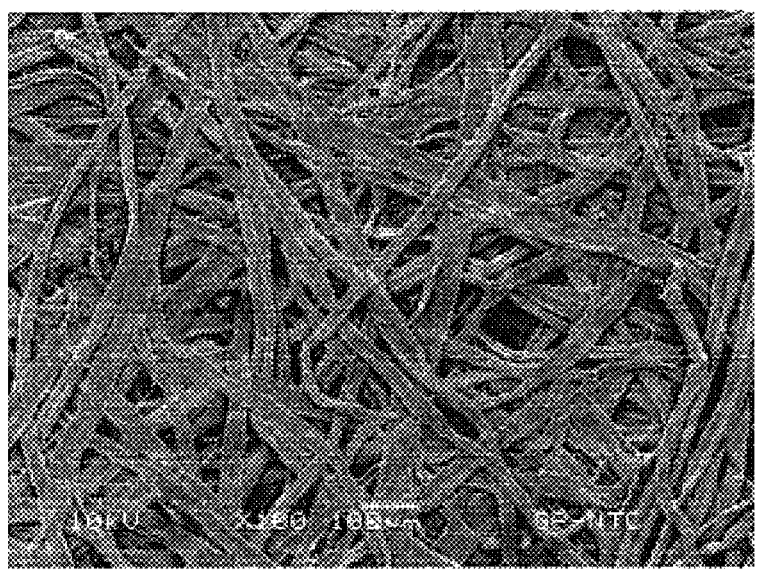
FIGS. 23A and 23B are a top view and cross section respectively of absorbent sheet made from uncurled softwood Kraft fiber.
Figure 23B:
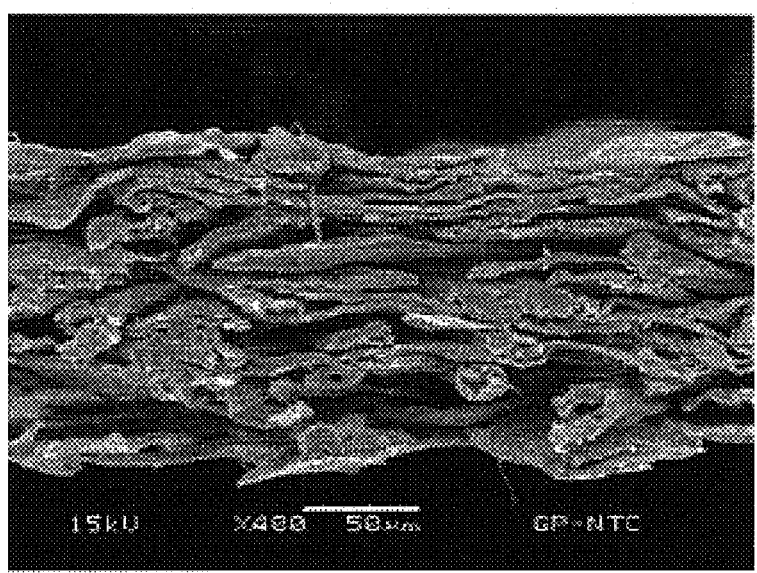
Figure 24A:
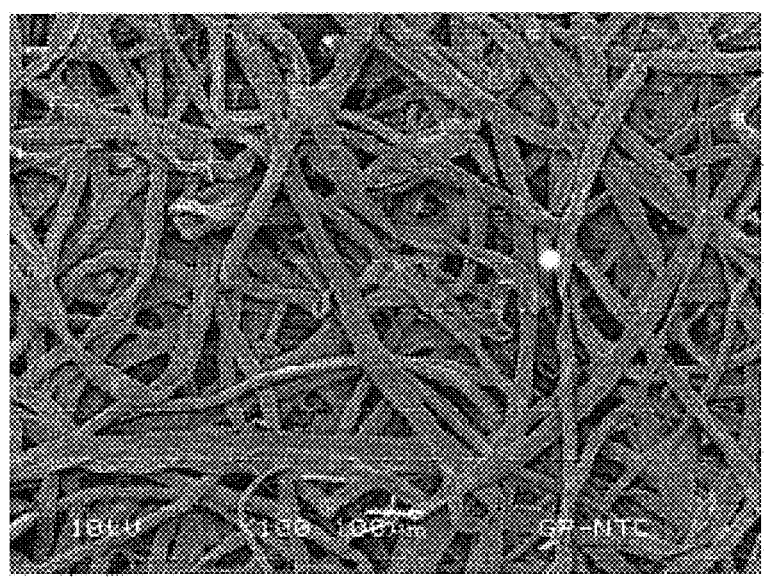
FIGS. 24A and 24B are a top view and cross section respectively of absorbent sheet made from curled softwood Kraft fiber.
Figure 24B:
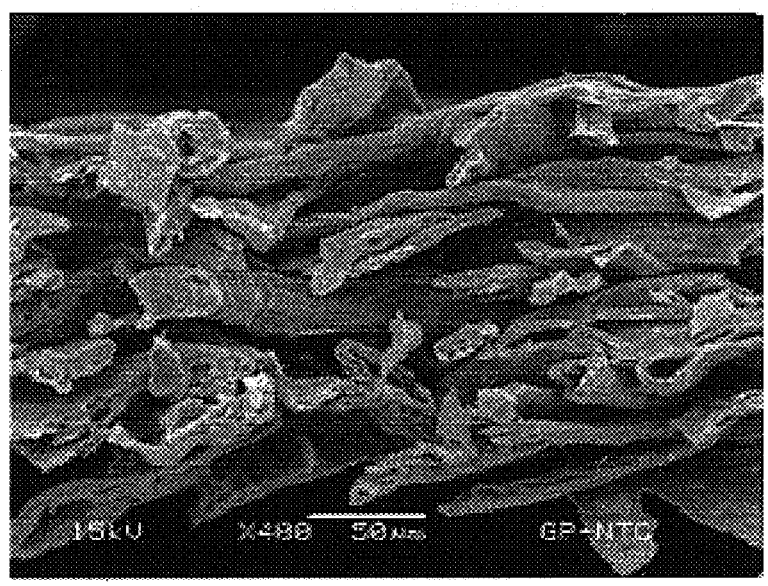

Following the procedures noted above a rotoclave was used to impart curl to Southern Softwood Kraft fiber in accordance with the invention. FIGS. 24A and 24B are photomicrographs of the handsheets made from the curled fibers, whereas FIGS. 23A and 23B are photomicrographs of sheet made from untreated fiber. Table 6 provides fiber and absorbent sheet properties.

It can be seen from FIGS. 23A and 23B that the untreated SSK exhibited much less bulk than the handsheet produced from curled Southern Softwood Kraft shown in FIGS. 24A and 24B.

TABLE 6

Southern Softwood Kraft Fiber and Sheet Properties

| Example | CSF (ml) | BULK (cm$^3$/g) | STRETCH (%) | BREAKING LENGTH (km) | TEA INDEX (J/m$^2$* m$^2$/g) | ZDT FIBER BOND (psi) | AIR FRAZIER (ft$^3$/min/ft$^2$) | SAT Slow Rate Time (s) | SAT Slow Rate Rate (g/s$^{.5}$) | SAT Slow Rate Capacity (g/m$^2$) | SAT Slow Rate Norm. Capacity (g/g) |
|---|---|---|---|---|---|---|---|---|---|---|---|
| 27 | 744 | 2.10 | 1.01 | 0.97 | 0.09 | 26.8 | 23.6 | 539 | 0.040 | 244 | 3.9 |
| 28 | 768 | 2.13 | 1.13 | 1.08 | 0.12 | 25.7 | 23.3 | 604 | 0.042 | 252 | 4.0 |
| 29 (SW starting pulp) | | 1.83 | 1.57 | 1.99 | 0.27 | 29.1 | 10.8 | 460 | 0.032 | 209 | 3.0 |
| Curled Average | | 2.12 | 1.07 | 1.02 | 0.10 | 26.3 | 23.4 | 571 | 0.041 | 248 | 4.0 |
| Percent Change | | 16% | −32% | −49% | −62% | −10% | 118% | 24% | 27% | 19% | 31% |

Optest FQA

| Sample | Ln (mm) | Lw (mm) | Lz (mm) | FINES % P < 0.2 (mm) | FINES % W < 0.2 (mm) | CURL Ln | CURL Length Weighted | KINK Index | KINK Angle ° | KINK Kink/mm |
|---|---|---|---|---|---|---|---|---|---|---|
| 27 | 0.80 | 2.21 | 2.98 | 52.92 | 7.37 | 0.308 | 0.365 | 2.840 | 113.50 | 1.29 |
| 28 | 0.87 | 2.30 | 3.07 | 49.27 | 6.27 | 0.299 | 0.348 | 2.850 | 115.40 | 1.29 |
| 29 (SW starting pulp) | 0.99 | 2.56 | 3.30 | 49.35 | 5.41 | 0.115 | 0.125 | 1.520 | 54.90 | 0.76 |

EXAMPLES 30-65

Following the procedures noted above a series of fibers were curled and made into absorbent sheet as is set forth in Table 7. Note that "psi" refers to gauge pressure, psig, in the tables which follow.

TABLE 7

Rotoclave Conditions and FQA Test Results for Southern Softwood Kraft

| | Rotoclave Conditions | | | | FQA Test Results | | | | | | |
|---|---|---|---|---|---|---|---|---|---|---|---|
| | Cons. | Pres. | Rev. | Time | Lw Fibers | | Lw Curl | | | | |
| Example # | % | Psi | # | min. | mm | % Fines | Ave | <1 mm | 1-1.5 mm | >1.5 mm | Comments |
| 30 (Control) | | 0 | 0 | 0 | 2.52 | 6.5 | 0.14 | 0.08 | 0.11 | 0.14 | |
| 31 | 20 | 0 | 300 | 20 | 2.43 | 6.0 | 0.24 | | | | 15 rpm |
| 32 | 20 | 20 | 100 | 14 | 2.44 | 5.7 | 0.27 | 0.13 | 0.20 | 0.29 | |
| 33 | 20 | 30 | 100 | | 2.32 | 6.7 | 0.29 | 0.14 | 0.21 | 0.32 | |
| 34 | 20 | 50 | 100 | | 2.20 | 7.4 | 0.39 | 0.18 | 0.27 | 0.44 | |
| 35 | 20 | 65 | 100 | | 2.25 | 6.6 | 0.33 | 0.16 | 0.25 | 0.37 | |
| 36 | 30 | 20 | 100 | | 2.35 | 6.3 | 0.25 | 0.11 | 0.18 | 0.28 | |
| 37 | 30 | 30 | 100 | | 2.35 | 6.9 | 0.22 | 0.12 | 0.18 | 0.24 | |
| 38 | 30 | 50 | 100 | | 2.22 | 7.6 | 0.28 | 0.13 | 0.21 | 0.32 | |
| 39 | 30 | 65 | 100 | | 2.33 | 6.8 | 0.27 | 0.15 | 0.21 | 0.29 | |

TABLE 7-continued

Rotoclave Conditions and FQA Test Results for Southern Softwood Kraft

| Example # | Rotoclave Conditions | | | | FQA Test Results | | | | | | |
|---|---|---|---|---|---|---|---|---|---|---|---|
| | Cons. % | Pres. Psi | Rev. # | Time min. | Lw Fibers mm | % Fines | Lw Curl Ave | <1 mm | 1-1.5 mm | >1.5 mm | Comments |
| 40 | 20 | 20 | 300 | 43 | 2.25 | 7.2 | 0.31 | 0.14 | 0.23 | 0.34 | |
| 41 | 20 | 30 | 300 | | 2.09 | 6.7 | 0.34 | 0.18 | 0.25 | 0.38 | |
| 42 | 20 | 50 | 300 | | 2.05 | 7.2 | 0.40 | 0.20 | 0.32 | 0.45 | |
| 43 | 20 | 50 | 300 | 20 | 2.04 | 8.3 | 0.36 | | | | 15 rpm |
| 44 | 20 | 65 | 300 | 43 | 2.16 | 8.0 | 0.38 | 0.17 | 0.34 | 0.42 | |
| 45 | 30 | 20 | 300 | | 2.36 | 7.2 | 0.22 | 0.11 | 0.19 | 0.24 | |
| 46 | 30 | 30 | 300 | | 2.26 | 6.8 | 0.27 | 0.15 | 0.20 | 0.29 | |
| 47 | 30 | 50 | 300 | | 2.17 | 6.2 | 0.32 | 0.18 | 0.26 | 0.35 | |
| 48 | 30 | 50 | 300 | 20 | 2.26 | 6.7 | 0.33 | | | | |
| 49 | 30 | 65 | 300 | 43 | 2.04 | 11.3 | 0.28 | 0.17 | 0.23 | 0.32 | |
| 50 | 30 | 65 | 300 | 20 | 2.08 | 8.6 | 0.32 | | | | 15 rpm |
| 51 | 20 | 20 | 900 | 128 | 2.14 | 7.8 | 0.35 | 0.18 | 0.27 | 0.39 | |
| 52 | 20 | 30 | 900 | | 2.06 | 8.2 | 0.37 | 0.19 | 0.31 | 0.41 | |
| 53 | 20 | 50 | 900 | | 1.97 | 8.7 | 0.40 | 0.21 | 0.33 | 0.44 | |
| 54 | 20 | 65 | 900 | | 2.02 | 9.3 | 0.41 | 0.21 | 0.36 | 0.45 | |
| 55 | 30 | 20 | 900 | | 2.23 | 6.5 | 0.33 | 0.16 | 0.28 | 0.36 | |
| 56 | 30 | 30 | 900 | | 2.26 | 6.8 | 0.34 | 0.17 | 0.26 | 0.37 | Bearing trouble |
| 57 | 30 | 50 | 900 | | 1.92 | 10.4 | 0.34 | 0.20 | 0.29 | 0.38 | |
| 58 | 30 | 50 | 900 | 60 | 2.03 | 8.4 | 0.33 | | | | 15 rpm |
| 59 | 30 | 65 | 900 | 128 | 2.03 | 8.1 | 0.32 | 0.19 | 0.28 | 0.35 | |
| 60 | 20 | 50 | 300 | 25 | 2.30 | 5.8 | 0.33 | | | | 400 lbs, 12 rpm |
| 61 | 20 | 50 | 100 | 8 | 2.24 | 5.8 | 0.34 | | | | 400 lbs, 12 rpm |

Results are further summarized in Tables 8 and 9.

TABLE 8

Effect of Rotoclave Consistency and Revs on Pulp and Handsheet Properties

| Rotoclave | | FQA Test Results (Lw) | | | Spec. | SAT Slow Rate | | Tensile | GE |
|---|---|---|---|---|---|---|---|---|---|
| Cons. (%) | Revs (#) | Curl Index | Length (mm) | Fines (%) | Volume (cm$^3$/g) | Capacity (g/g) | Rate (g/s$^{0.5}$) | Strength (kg/15 mm) | Brightn. (%) |
| 20 | 100 | 0.32 | 2.3 | 6.6 | 1.97 | 2.9 | 0.038 | 1.46 | 84.5 |
| | 300 | 0.36 | 2.1 | 7.4 | 2.04 | 3.2 | 0.044 | 1.17 | 83.4 |
| | 900 | 0.38 | 2.0 | 8.5 | 1.91 | 2.7 | 0.035 | 1.12 | 78.5 |
| 30 | 100 | 0.26 | 2.3 | 6.9 | 1.91 | 2.9 | 0.037 | 1.61 | 84.2 |
| | 300 | 0.29 | 2.2 | 7.8 | 2.04 | 2.9 | 0.036 | 1.37 | 82.9 |
| | 900 | 0.33 | 2.1 | 8.1 | 1.96 | 2.6 | 0.034 | 1.28 | 77.2 |
| Control SSK pulp | | 0.14 | 2.5 | 6.5 | 1.84 | 2.7 | 0.032 | 2.13 | 86.0 |

TABLE 9

Effect of Steam Pressure on Pulp and Handsheet Properties at 20% Cons., 300 Revs.

| Rotoclave | | FQA Test Results (Lw) | | | Spec. | SAT Slow Rate | | Tensile | GE |
|---|---|---|---|---|---|---|---|---|---|
| Cons. (%) | Steam P. (psi) | Curl Index | Length (mm) | Fines (%) | Volume (cm$^3$/g) | Capacity (g/g) | Rate (g/s$^{0.5}$) | Strength (kg/15 mm) | Brightn. (%) |
| 20 | 20 | 0.31 | 2.25 | 7.2 | 2.14 | 3.4 | 0.046 | 1.36 | 86.3 |
| | 30 | 0.34 | 2.09 | 6.7 | 2.00 | 3.4 | 0.049 | 1.22 | 82.6 |
| | 50 | 0.40 | 2.05 | 7.1 | 2.01 | 3.3 | 0.052 | 1.08 | 82.6 |
| | 65 | 0.38 | 2.16 | 8.0 | 2.02 | 2.6 | 0.031 | 1.02 | 82.2 |
| Control SSK pulp | | 0.14 | 2.52 | 6.5 | 1.84 | 2.7 | 0.032 | 2.13 | 86.0 |

Table 10 sets forth physical properties of handsheets made from the treated Kraft and untreated fiber, Control Example 30.

TABLE 10

Physical Properties* of Handsheets Corresponding to each Rotoclave Batch

| Example # | Rotoclave Conditions | | | | Handsheet | | SAT Slow Rate | | | Strength | | | G.E. | Comments |
|---|---|---|---|---|---|---|---|---|---|---|---|---|---|---|
| | Cons. % | Pres. psi | Rev. # | Time min. | BW gsm | Sp. Vol cm³/g | Rate g/s^0.5 | Cap. g/g | Cap. g/m² | Tensile kg/15 mm | Stretch % | ZDT psi | Brightn. % | |
| 30 (Control) | | | | | 64.0 | 1.84 | 0.032 | 2.7 | 171 | 2.13 | 1.8 | 39.9 | 86.0 | |
| 32 | 20 | 20 | 100 | 14 | 63.4 | 1.91 | 0.034 | 2.9 | 186 | 1.63 | 1.5 | 44.9 | 84.9 | corrected |
| 33 | 20 | 30 | 100 | | 64.4 | 1.94 | 0.036 | 3.0 | 192 | 1.73 | 1.8 | 40.5 | 86.0 | |
| 34 | 20 | 50 | 100 | | 67.0 | 2.03 | 0.040 | 2.9 | 195 | 1.23 | 1.4 | 33.5 | 83.3 | |
| 35 | 20 | 65 | 100 | | 64.6 | 2.00 | 0.041 | 2.9 | 188 | 1.26 | 1.5 | 32.4 | 83.8 | |
| 36 | 30 | 20 | 100 | | 61.3 | 1.88 | 0.037 | 3.0 | 183 | 1.70 | 1.8 | 43.5 | 84.9 | |
| 37 | 30 | 30 | 100 | | 60.4 | 1.87 | 0.037 | 2.8 | 172 | 1.68 | 1.6 | 50.8 | 85.3 | |
| 38 | 30 | 50 | 100 | | 65.5 | 1.99 | 0.036 | 2.9 | 190 | 1.54 | 1.6 | 37.1 | 83.4 | |
| 39 | 30 | 65 | 100 | | 64.5 | 1.93 | 0.036 | 2.9 | 184 | 1.51 | 1.5 | 40.1 | 83.2 | |
| 40 | 20 | 20 | 300 | 43 | 63.0 | 2.14 | 0.046 | 3.4 | 217 | 1.36 | 1.5 | 33.4 | 86.3 | |
| 41 | 20 | 30 | 300 | | 65.4 | 2.00 | 0.049 | 3.4 | 223 | 1.22 | 1.3 | 37.2 | 82.6 | |
| 42 | 20 | 50 | 300 | | 70.9 | 2.01 | 0.052 | 3.3 | 234 | 1.08 | 1.2 | 32.9 | 82.6 | |
| 44 | 20 | 65 | 300 | | 61.8 | 2.02 | 0.031 | 2.6 | 159 | 1.02 | 1.2 | 49.9 | 82.2 | |
| 45 | 30 | 20 | 300 | | 63.8 | 1.95 | 0.035 | 3.0 | 189 | 1.75 | 1.7 | 36.1 | 85.3 | |
| 46 | 30 | 30 | 300 | | 65.3 | 1.92 | 0.041 | 3.0 | 198 | 1.42 | 1.2 | 39.7 | 84.4 | |
| 47 | 30 | 50 | 300 | | 59.1 | 1.99 | 0.033 | 2.8 | 168 | 1.06 | 1.2 | 43.2 | 80.9 | |
| 48 | 30 | 65 | 300 | | 61.3 | 2.28 | 0.035 | 2.7 | 164 | 1.26 | 1.4 | 44.8 | 80.8 | |
| 49 | 20 | 20 | 900 | 128 | 63.0 | 2.01 | 0.038 | 3.0 | 188 | 1.22 | 1.4 | 44.4 | 84.1 | Bearing trouble |
| 51 | 20 | 30 | 900 | | 63.4 | 1.63 | 0.035 | 2.8 | 177 | 1.16 | 1.4 | 42.8 | 82.8 | |
| 52 | 20 | 50 | 900 | | 69.4 | 2.03 | 0.040 | 2.6 | 181 | 1.06 | 1.2 | 41.9 | 77.2 | |
| 53 | 20 | 65 | 900 | | 65.8 | 1.97 | 0.028 | 2.3 | 152 | 1.05 | 1.1 | 56.6 | 69.8 | |
| 54 | 30 | 20 | 900 | | 63.6 | 1.97 | 0.040 | 3.1 | 197 | 1.36 | 1.5 | 41.1 | 83.0 | |
| 55 | 30 | 30 | 900 | | 65.9 | 1.96 | 0.040 | 3.1 | 206 | 1.28 | 1.4 | 36.6 | 82.8 | |
| 56 | 30 | 50 | 900 | | 65.3 | 2.01 | 0.031 | 2.4 | 159 | 1.19 | 1.3 | 42.7 | 78.7 | |
| 57 | 30 | 65 | 900 | 128 | 63.4 | 1.90 | 0.023 | 1.9 | 121 | 1.30 | 1.2 | 69.8 | 64.4 | |
| 58 | 20 | 50 | 300 | 25 | | | | | | | | | | 400 lbs, 12 rpm |
| 59 | 20 | 50 | 100 | 8 | | | | | | | | | | 400 lbs, 12 rpm |

*= GE Brightness was measured on Label Side without fluorescence.
note:
the SAT values of Example 36 are based on the average of 2 results instead of 3, since the third result was double the other values The influence of production capacity on curl index for a number of batches is seen in Table 11 at 50 psig steam pressure.

TABLE 11

Operation at 50 psig

Production Rate at 50 psi Steam for Different Rotoclave Settings

| Revolutions | | 100 Revs | | | 150 Revs | | 300 Revs | | |
|---|---|---|---|---|---|---|---|---|---|
| Example # | | 33 | 38 | 61 | 65 | 64* | 42 | 63 | 43 |
| BD Production | TPD | 2.6 | 3.4 | 3.5 | 3.9 | 3.2 | 1.7 | 1.7 | 2.4 |
| Batches/24 hr day | # | 27.9 | 35.8 | 18.6 | 27.2 | 22.8 | 18.0 | 18.0 | 25.1 |
| Curl Index | | 0.39 | 0.28 | 0.34 | 0.31 | 0.32 | 0.40 | 0.35 | 0.36 |
| RPM | # | 7 | 7 | 12 | 15 | 15 | 7 | 7 | 15 |
| BD Batch size | lbs | 190 | 190 | 380 | 285 | 285 | 190 | 190 | 190 |
| Consistency | % | 20 | 30 | 20 | 25 | 20 | 20 | 20 | 20 |
| Water | lbs | 760 | 443 | 1520 | 855 | 1140 | 760 | 760 | 760 |
| Total weight | lbs | 950 | 633 | 1900 | 1140 | 1425 | 950 | 950 | 950 |
| Load + Fill Time[1] | min. | 4.4 | 4.0 | 6.3 | 5.0 | 5.4 | 4.4 | 4.4 | 4.4 |
| Warm up time[2] | min. | 14.4 | 9.3 | 26.9 | 16.0 | 20.7 | 14.4 | 14.4 | 14.4 |
| Time at set point[3] | min. | 14.3 | 14.3 | 8.3 | 10.0 | 10.0 | 42.9 | 42.9 | 20.0 |
| Cooling time[4] | min. | 11.0 | 7.7 | 21.0 | 13.0 | 16.0 | 11.0 | 11.0 | 11.0 |
| Emptying time[5] | min. | 8 | 5 | 15 | 9.0 | 11.3 | 8 | 8 | 8 |
| Total | min. | 52 | 40 | 78 | 53 | 63 | 80 | 80 | 57 |

TABLE 11-continued

Operation at 50 psig

Production Rate at 50 psi Steam for Different Rotoclave Settings

| Revolutions | | 300 Revs | | | 900 Revs | | | |
|---|---|---|---|---|---|---|---|---|
| Example # | | 43 | 47 | 48 | 53 | 62 | 57 | 58 |
| BD Production | TPD | 2.9 | 2.0 | 3.0 | 0.8 | 0.8 | 0.9 | 1.6 |
| Batches/24 hr day | # | 15.3 | 20.9 | 31.4 | 8.7 | 8.7 | 9.3 | 16.8 |
| Curl Index | | 0.33 | 0.32 | 0.33 | 0.40 | 0.40 | 0.34 | 0.33 |
| RPM | # | 12 | 7 | 15 | 7 | 7 | 7 | 15 |
| BD Batch size | lbs | 380 | 190 | 190 | 190 | 190 | 190 | 190 |
| Consistency | % | 20 | 30 | 30 | 20 | 20 | 30 | 30 |
| Water | lbs | 1520 | 443 | 443 | 760 | 760 | 443 | 443 |
| Total weight | lbs | 1900 | 633 | 633 | 950 | 950 | 633 | 633 |
| Load + Fill Time[1] | min. | 6.3 | 4.0 | 4.0 | 4.4 | 4.4 | 4.0 | 4.0 |
| Warm up time[2] | min. | 26.9 | 9.3 | 9.3 | 14.4 | 14.4 | 9.3 | 9.3 |
| Time at set point[3] | min. | 25.0 | 42.9 | 20.0 | 128.6 | 128.6 | 128.6 | 60.0 |
| Cooling time[4] | min. | 21.0 | 7.7 | 7.7 | 11.0 | 11.0 | 7.7 | 7.7 |
| Emptying time[5] | min. | 15 | 5 | 5 | 8 | 8 | 5 | 5 |
| Total | min. | 94 | 69 | 46 | 166 | 166 | 155 | 86 |

*= Energy Consumption for Example 64 was no load = 0.64 kw; loaded = 1.48 kw; net load - 0.84 kw for 63 minute run (0.044 days).
Notes:
[1]= 85 sec × lbs fiber/285 + 150 sec door closing and deairation + 65 sec × lbs water/855
[2]= Based on 16 min. for 855 lbs water. Other weights adjusted proportionately after allowing 2 min. for heating empty Roto.
[3]= Based on Revolutions/rpm
[4]= Based on 1 min. vent to atmosphere + 12 minutes cooldown for 855 lbs water. Other weights adjusted proportionately.
[5]= Based on 9 minutes for total weight of 1140 lbs. Other weights adjusted proportionately.

The data in Table 11 may be converted to energy applied to the pulp by correlation with the operating conditions appearing below and in Table 12:

Operating Conditions:

470 lb wet fiber at 22.4% consistency; Southern Bleached Kraft Hardwood pulped in pilot pulper and dewatered on twin wire press; 260 F Operating Temperature.

Further data and calculations appear in Table 12 below and net horsepower is plotted vs. RPM in FIG. 25:

TABLE 12

Operating Data and Energy Input

| | Horse Power | | | Pulp Oven Dry | | Power Applied HP | Total Power HP Day/Ton Minutes | | |
|---|---|---|---|---|---|---|---|---|---|
| Drum RPM | Un-Loaded | Loaded | Net | lb | Ton | Day/Ton/Minute | 20 | 30 | 40 |
| 25 | 1.73 | 3.1 | 1.37 | 105 | 0.0525 | 0.018 | 0.3624 | 0.5437 | 0.7249 |
| 20.6 | 1.32 | 2.73 | 1.41 | 105 | 0.0525 | 0.019 | 0.3730 | 0.5595 | 0.7460 |
| 15.4 | 0.89 | 2.01 | 1.12 | 105 | 0.0525 | 0.015 | 0.2963 | 0.4444 | 0.5926 |
| 10.3 | 0.51 | 1.13 | 0.62 | 105 | 0.0525 | 0.008 | 0.1640 | 0.2460 | 0.3280 |
| 5.1 | 0.08 | 0.081 | 0.001 | 105 | 0.0525 | 0.000 | 0.0003 | 0.0004 | 0.0005 |

The majority of the runs in Tables 7-11 thus had net power input to the pulp of less than 0.5 HP-Day/Ton. The invention is remarkably effective even at these low power inputs to provide durable curl to Kraft fiber.

Alternative Embodiments

As will be appreciated from the foregoing, the present invention has many aspects. Some specific and preferred embodiments of the invention are enumerated immediately below.

A method of providing papermaking fiber with durable curl including: (a) introducing papermaking fiber consisting predominantly of chemical pulp in substantially fibrous form into a pressure vessel at a consistency of from about 5 to about 45 percent; (b) concurrently heat-treating and convolving the fiber in the pressure vessel by way of applying mechanical agitation to the fiber in the presence of saturated steam at a pressure of from about 35 to about 90 psig for a treatment duration of at least about 5 minutes, wherein the treatment of the fiber is operable to increase the curl index of the fiber by at least about 50 percent. Preferably, the treatment is operable to increase the curl index of the fiber by at least about 100 percent and the steam is maintained at a pressure of from about 35 psig to about 75 psig. Typically, the steam is maintained at a pressure of from about 40 psig to about 65 psig and, most preferably, the steam is maintained at a pressure of from about 45 psig to about 55 psig. So also, the fiber is preferably heat-treated and convolved in the pressure vessel at least about 10 minutes, and more preferably the fiber is heat-treated and convolved in the pressure vessel at least about 15 minutes. The treatment may involve heat-treating and convolving in the pressure vessel for up to about 60 minutes, with up to about 30 minutes being more typical.

The pressure vessel may be a rotatable drum and the papermaking fiber comprises Kraft fiber or the papermaking fiber comprises secondary fiber comprising Kraft fiber. Preferably, the papermaking fiber treated is at least about 15 percent chemical pulp and still more preferably at best about 90 weight percent chemical pulp. Typically, the papermaking is maintained at a consistency of from about 10 to about 40 percent during heat-treating and convolving thereof and preferably the papermaking is maintained at a consistency of from about 15 to about 25 or about 30 percent during heat-treating and convolving thereof. Subsequent to treatment, the fiber is incorporated into an absorbent cellulosic sheet.

In another aspect there is provided in accordance with the present invention a method for providing papermaking fiber with durable curl and preferably increasing the tubularity of the fiber including the steps of:
 a) introducing papermaking fiber in substantially fibrous form into a rotatable drum;
 b) rotating the drum containing the papermaking fiber while maintaining;
  i) the fiber in aqueous dispersion having a consistency of from about 5 to about 45 percent; and
  ii) a temperature above about 100° C.

The drum is configured such that the aqueous fiber dispersion contacts the rotating walls of the drum during rotation thereof so that the mechanical action of the drum on the dispersion at elevated temperature provides a durable curl to the papermaking fiber. After the fiber is curled it is removed from the drum.

In preferred embodiments, the method increases the curl index of the papermaking fiber by at least 20 percent. In many cases the method is effective to increase the curl index by at least 50 percent; at least 100 percent, and in many cases by at least 200 percent or more.

In many preferred embodiments, the papermaking fiber consists predominantly of chemical pulp such as Kraft pulp or sulfite pulp. The fiber may be at least 70 percent by weight chemical pulp; at least 80 percent by weight chemical pulp; or at least 90 percent by weight chemical pulp. The fiber may likewise contain mechanical pulp for example it may contain up to 15 weight percent mechanical pulp, 25 weight percent mechanical pulp, 35 weight percent mechanical pulp or more. Furnishes having KAPPA numbers of up to about 60 are preferred as are those with KAPPA numbers up to about 40. Particularly preferred furnishes have KAPPA numbers of less than 20. The invention is particularly suitable in connection with secondary pulp having the aforementioned characteristics.

Preferably the rotatable drum is rotated about an inclined axis of rotation having, for example, an angle of inclination with respect to a horizontal of from about 5 to about 15°. So also, the drum is preferably provided with a helical baffle affixed to the interior sidewall of the drum as well as a plurality of lifting paddles affixed to the interior sidewall of the drum. The drum is operated in a batchwise mode in some embodiments wherein the step of rotating the drum containing the papermaking fiber while maintaining consistency and temperature has duration of from about 10 minutes to about 90 minutes. Typical durations of the curling step may be from about 20 minutes to about 80 minutes with from about 40 minutes to about 75 minutes being typical. In other embodiments the apparatus may be operated in a continuous mode. In any case, the drum is typically maintained at its operating temperature by supplying saturated steam to the drum. The temperature is typically between about 100° C. and about 150° C. at a pressure between about 1 and 90 psig. There are optionally provided chemicals such as bleaching agents to the aqueous dispersion in the drum. Common bleaching agents include sulfites, peroxides and hypochlorite. The fiber dispersion is typically maintained at a consistency of from about 10 and 40 percent during curling. Between about 15 and about 25 to about 30 percent are typical consistencies for the fiber dispersion being curled in the drum. Preferably the rotatable drum is substantially cylindrical as shown in the various drawings.

Fiber curled in accordance with the present invention is incorporated into absorbent sheet by any number of processes known in the art. A typical method of making an absorbent sheet in accordance with the present invention includes preparing an aqueous papermaking furnish by way of a procedure including:
 (1) providing a first curled papermaking fiber component prepared by way of a curling method of the invention;
 (2) optionally admixing a second papermaking fiber component with a first curl papermaking fiber component;
 (3) optionally adjusting the moisture content of the papermaking fiber; and
 (4) forming the aqueous papermaking furnish into an absorbent sheet.

One way of making absorbent sheets includes dewatering the furnish to form a nascent web, applying the nascent web to a heated rotating cylinder and creping the web from the heated rotating cylinder. Such processes are known generally as conventional wet press processes in the art. Another method of forming absorbent sheet in accordance with the invention comprises throughdrying the papermaking furnish on a foraminous support to produce an at least partially dried web and applying the partially dried web to a heated rotating cylinder and creping the web therefrom. Such processes are known as through air dry or (TAD) processes. TAD processes may include creping or may be processes wherein the web is uncreped. In uncreped processes the function of the creping blade is replaced by way of transferring the wet furnish between fabrics traveling at different speeds as is well known in the art. In any event, the papermaking furnish may be from 10 to about 90 percent by weight of the first curled papermaking fiber component and from about 90 to about 10 weight percent of the second papermaking fiber component or one may elect to maintain the various components within a 20/80 or 80/20 relative weight range. In a preferred embodiment the papermaking furnish includes from about 30 to about 60 percent by weight of the first curled papermaking fiber component and from about 70 to about 40 weight percent of a second papermaking fiber component. In another preferred embodiment, the papermaking furnish includes from about 20 to about 40 weight percent of the first curled papermaking fiber component and from about 80 to about 60 weight percent of the second papermaking fiber component.

The present invention includes, in a still further aspect thereof, a method of recycling waste paper to form a papermaking fiber with durable curl comprising the steps of:
 a) defibering waste paper in the presence of water to form an aqueous dispersion of secondary fiber and substantially fibrous form;
 b) providing the secondary fiber with a durable curl by way of a method of the invention described above; and
 c) removing contaminants from the aqueous dispersion of secondary fiber before or after curling utilizing at least one technique selected from the group consisting of screening, hydrocloning and flotation.

Suitable methods of removing contaminants from the defibered wastepaper are described in more detail in U.S. Pat. No. 6,416,622.

In yet still another aspect of the present invention there is provided a method of increasing the absorbency of absorbent sheet consisting predominantly of recycled fiber having a KAPPA number of up to about 60 including the step of concurrently heat-treating and convolving at least about 20 weight percent of the recycled fiber prior to its incorporation into the sheet wherein the concurrent heat-treatment and convolving of the fiber is operative to increase the absorbency of the sheet by at least about 25 percent as compared with a sheet of like construction and composition. In some cases at least about 30 percent, 50 percent, or 75 percent of the recycled fiber used to make the sheet is heat-treated and convolved prior to its incorporation into the sheet. In many cases the procedure is operative to increase the absorbency by at least about 40, 50, 75 or even 100 percent as compared with a sheet of like construction and composition.

While the invention has been described in connection with numerous examples and specific embodiments within the spirit and scope of the present invention, modifications to specific features within the scope of the appended claims will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary.

What is claimed is:

1. A method of providing papermaking fibers with durable curl comprising:
    a) introducing papermaking fiber into a rotatable drum adapted for operation at elevated pressure;
    b) rotating the drum containing the papermaking fiber while maintaining:
        i) the fiber in aqueous dispersion having a consistency of from about 5 to about 45 percent;
        ii) a temperature of above about 100° C.;
    the drum being configured such that the aqueous fiber dispersion contacts the rotating wall of the drum during rotation thereof and the mechanical action of the drum on the dispersion provides a durable curl to the papermaking fiber;
    removing the curled fiber from the rotatable drum wherein the temperature, time, consistency and energy input to the fiber are controlled such that fibers treated exhibit a curl elevation of at least 50 percent at 1 hour storage time, wherein the net mechanical energy input to the fiber is less than about 0.75 HP-Day/Ton.

2. The method according to claim 1, wherein the treated fiber exhibits a curl elevation of at least 100 percent at 1 hour storage time.

3. The method according to claim 1, wherein the treated fiber exhibits a curl elevation of at least 150 percent at 1 hour storage time.

4. The method according to claim 1, wherein the net mechanical energy input to the fiber is less than about 0.5 HP-Day/Ton.

5. The method according to claim 1, wherein the net mechanical energy input to the fiber is from about 0.2 to about 0.6 HP-Day/Ton.

6. The method according to claim 1, wherein the papermaking fiber is introduced into the drum in substantially fibrous form.

7. The method according to claim 1, wherein steam is maintained in the drum at a pressure of from about 35 psig to about 75 psig.

8. The method according to claim 1, wherein the fiber is heat-treated and convolved in the drum for at least about 15 minutes.

9. The method according to claim 1, wherein the fiber is heat-treated and convolved in the drum for up to about 30 minutes.

10. The method according to claim 1, wherein the papermaking fiber comprises low yield fiber.

11. The method according to claim 1, wherein the papermaking fiber comprises secondary fiber.

12. A method of providing papermaking fiber with durable curl comprising:
    a) introducing papermaking fiber consisting predominantly of chemical pulp in substantially fibrous form into a pressure vessel at a consistency of from about 5 to about 45 percent;
    b) concurrently heat-treating and convolving the fiber in the pressure vessel by way of applying mechanical agitation to the fiber in the presence of saturated steam at a pressure of from about 35 psig to about 90 psig for a treatment duration of at least about 5 minutes,
    wherein the treatment of the fiber is operable to increase the curl index of the fiber by at least about 50 percent, and wherein further the net mechanical energy input to the fiber is less than about 0.75 HP-Day/Ton.

13. A method of providing papermaking fibers with durable curl comprising:
    a) introducing papermaking fiber in web form into a rotatable drum adapted for operation at elevated pressure;
    b) rotating the drum containing the papermaking fiber while maintaining:
        i) the fiber in aqueous dispersion having a consistency of from about 5 to about 45 percent;
        ii) a temperature of above about 100° C.;
    the drum being configured such that the aqueous fiber dispersion contacts the rotating wall of the drum during rotation thereof and the mechanical action of the drum on the dispersion provides a durable curl to the papermaking fiber; and removing the curled fiber from the rotatable drum wherein the temperature, time, consistency and energy input to the fiber are controlled such that fibers contained in a web form are rendered into substantially fibrous form and the curl index of the papermaking fiber is increased by at least 20 percent as compared with a control pulp from the same source.

14. The method of providing papermaking fibers with durable curl as in claim 13, wherein the fiber is introduced in the form of wastepaper and further comprising the step of adding a chemical aid to the pressurized rotatable drum.

15. The process as set forth in claim 13, wherein said chemical aids include at least one chemical selected from the group consisting of alkaline agent, buffer, bleaching agent, detergents, surfactants, solvents, dispersants, chelating agents, sequestrants, and mixtures thereof.

16. The process as set forth in claim 15, wherein said alkaline agent is sodium hydroxide.

17. The process as set forth in claim 15, wherein said bleaching agent is hydrogen peroxide or sodium hypochlorite.

18. The process as set forth in claim 13, wherein said chemical aid is a mixture of sodium hydroxide and hydrogen peroxide.

19. The process as set forth in claim 13, wherein said chemical aid comprises sodium hydroxide and the sodium hydroxide is present in the drum at a concentration of at least about 0.25 weight percent based on the amount of water and caustic in the drum.

* * * * *